(12) United States Patent
Ito

(10) Patent No.: US 9,037,874 B2
(45) Date of Patent: May 19, 2015

(54) SEMICONDUCTOR DEVICE WITH COPYRIGHT PROTECTION FUNCTION

(71) Applicant: KABUSHIKI KAISHA TOSHIBA, Minato-ku (JP)

(72) Inventor: Takafumi Ito, Ome (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 13/795,484

(22) Filed: Mar. 12, 2013

(65) Prior Publication Data

US 2013/0198441 A1    Aug. 1, 2013

Related U.S. Application Data

(62) Division of application No. 12/194,775, filed on Aug. 20, 2008.

(30) Foreign Application Priority Data

Aug. 22, 2007    (JP) .................................. 2007-215983

(51) Int. Cl.
*G06F 21/00*    (2013.01)
*G06F 12/14*    (2006.01)
(Continued)

(52) U.S. Cl.
CPC ............ *G06F 12/1416* (2013.01); *G06F 21/10* (2013.01); *G06F 21/79* (2013.01); *G06F 2221/0711* (2013.01); *G06F 12/0246* (2013.01)

(58) Field of Classification Search
CPC ... G06F 21/123; G06F 21/10; G06F 12/1416; G06F 21/79; G06F 12/0246; G05F 2221/0711
USPC ............................................ 713/193; 726/21
See application file for complete search history.

(56) References Cited

U.S. PATENT DOCUMENTS 6,704,871 B1 * 3/2004 Kaplan et al. .................. 713/192
6,725,286 B2    4/2004 Takahashi
(Continued)

FOREIGN PATENT DOCUMENTS

JP      2003-317054     11/2003
JP        3117981       12/2005

OTHER PUBLICATIONS

CPRM Speficiation: SD Memory Card Book, Revision 0.95. May 28, 2001.*

(Continued)

*Primary Examiner* — Techane Gergiso
*Assistant Examiner* — Thomas Ho
(74) *Attorney, Agent, or Firm* — Oblon, McClelland, Maier & Neustadt, L.L.P.

(57) ABSTRACT

A semiconductor device includes a serial communication interface connector, a non-volatile semiconductor memory, a memory controller, and a memory reader/writer. The serial communication interface connector is capable of being connected to a serial communication interface terminal of electronic equipment. The memory controller includes a memory interface connected to the non-volatile semiconductor memory and a copyright protection function and controls the non-volatile semiconductor memory. The memory reader/writer includes a controller interface connected to the memory controller and a serial communication interface connected to the serial communication interface connector.

5 Claims, 23 Drawing Sheets

(51) Int. Cl.
*G06F 21/10* (2013.01)
*G06F 21/79* (2013.01)
*G06F 12/02* (2006.01)

(56) References Cited

U.S. PATENT DOCUMENTS

| | | | |
|---|---|---|---|
| 7,092,256 | B1 | 8/2006 | Salazar et al. |
| 7,152,801 | B2 | 12/2006 | Cuellar et al. |
| 7,185,146 | B2 | 2/2007 | Masuyama et al. |
| 7,227,952 | B2 * | 6/2007 | Qawami et al. ............... 380/201 |
| 7,552,345 | B2 * | 6/2009 | Chang et al. .................. 713/193 |
| 2006/0075174 | A1 | 4/2006 | Vuong |
| 2006/0236026 | A1 * | 10/2006 | Hempel ........................ 711/103 |
| 2006/0269056 | A1 * | 11/2006 | Montag ......................... 380/205 |
| 2007/0176912 | A1 * | 8/2007 | Beames et al. ................ 345/204 |
| 2007/0239948 | A1 * | 10/2007 | Muraki et al. ................. 711/162 |
| 2008/0005590 | A1 * | 1/2008 | Kasahara et al. ............. 713/193 |
| 2010/0037069 | A1 * | 2/2010 | Deierling et al. ............. 713/193 |

OTHER PUBLICATIONS

Content Protection for Recordable Media Specification: SD Memory Card Book, revision 0.95, issued by intel, IBM, Matsushita Electric Industrial Co., and Toshiba Corp., May 28, 2001.

* cited by examiner

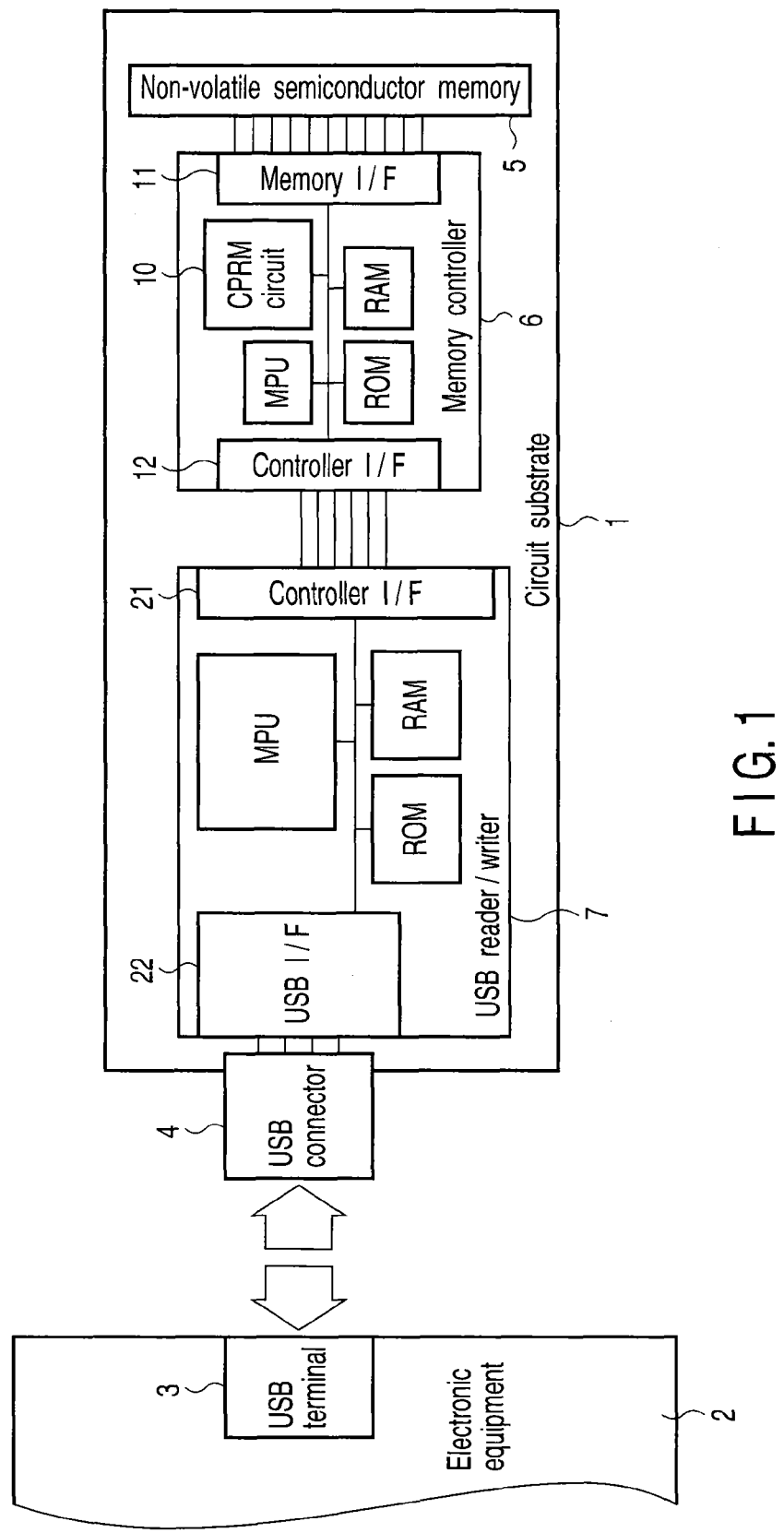
F I G. 1

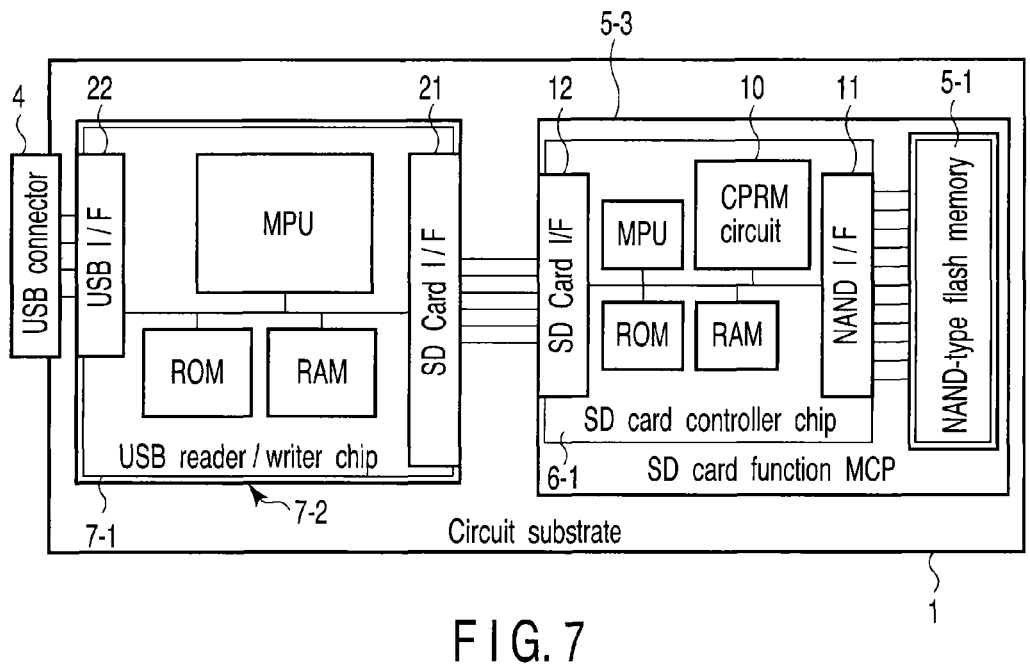
FIG. 7
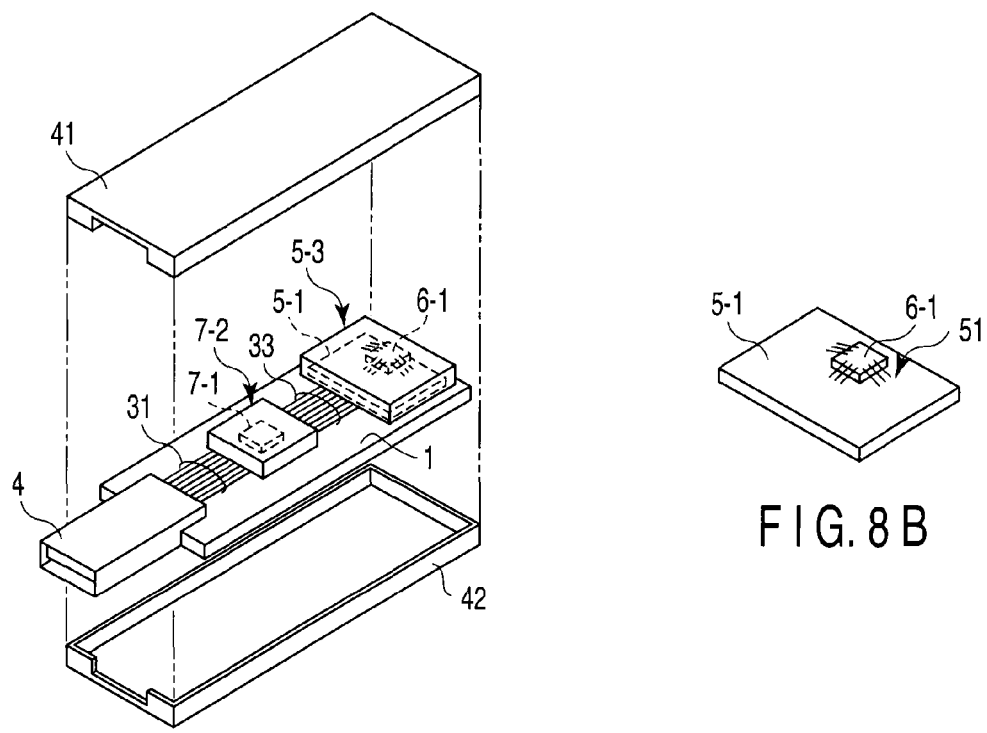
FIG. 8A
FIG. 8B

Communication packet on the USB interface
SCSI command set at the end point EP1 in writing data Communication packet on the USB interface
SCSI data set at the end point EP1 in writing data Extension Command Enable / Disable Mode

| Media Type | Normal Command | Extension Command |
|---|---|---|
| Not Present | Disable (No Media) | Disable |
| SD Memory Card | Enable | Enable |
| Others Media (MMC) | Enable | Enable |
| Illegal Media (Ex. SDIO Card) | Disable (No Media) | Enable |

Normal Command : SCSI Block Device Command Set
Extension Command : Vendor Unique Command Set

FIG. 14

Command Code

| Operation Code | Extension Command | Note |
|---|---|---|
| D0h | SD Card Passthrough Mode | |
| D1h | SD Execute (No Data) | |
| D2h | SD Execute (read from SD Card) | |
| D3h | SD Execute (write to SD Card) | |
| D4h | Get Response | |
| D5h | (Reserved) | ILLEGAL COMMAND |
| D6h | SD Hardware Reset | |

FIG. 15

SD Card Passthrough Mode

|   | 7 | 6 | 5 | 4 | 3 | 2 | 1 | 0 |
|---|---|---|---|---|---|---|---|---|
| 0 | Operation Code ||||||||
| 1 | LUN |||| Command Mode ||||
| 2 | Signature : 53h ('S') ||||||||
| 3 | Signature : 44h ('D') ||||||||
| 4 | Signature : 20h (' ') ||||||||
| 5 | Signature : 43h ('C') ||||||||
| 6 | Signature : 61h ('a') ||||||||
| 7 | Signature : 72h ('r') ||||||||
| 8 | Signature : 64h ('d') ||||||||
| 9 | Control Byte ||||||||

Command Mode : 0000 : Passthrough Command Disable
0001 : Passthrough Command Enable
0010 - 1111 : Reserved

FIG. 16

Data Format

|    | 7 | 6 | 5 | 4 | 3 | 2 | 1 | 0 |
|----|---|---|---|---|---|---|---|---|
| 0  | 00h (Fixed) ||||||||
| 1  | 00h (Fixed) ||||||||
| 2  | 00h (Reserved) ||||||||
| 3  | 0Eh (Fixed) ||||||||
| 4  | Version Number : 00h ||||||||
| 5  | WP | Media Type |||||||
| 6  | bit 7 | RCA (Low Byte) |||||| bit 0 |
| 7  | bit 15 | RCA (High Byte) |||||| bit 8 |
| 8  | Signature : 53h ('S') ||||||||
| 9  | Signature : 44h ('D') ||||||||
| 10 | Signature : 20h (' ') ||||||||
| 11 | Signature : 43h ('C') ||||||||
| 12 | Signature : 61h ('a') ||||||||
| 13 | Signature : 72h ('r') ||||||||
| 14 | Signature : 64h ('d') ||||||||
| 15 | Max LUN Number ||||||||
| 16 | 00h (Fixed) ||||||||
| 17 | 00h (Fixed) ||||||||

WP ----------------- 0 : No Write Protect, 1 : Write Protect
Media Type ---------- 0 : NotPresent, 1 : SD Memory Card, 2 : OthersMedia(MMC)
3 : Illegal Media (Ex. SDIO Card)
Max LUN Number --- Max LUN Number (0 : one drive, 1 : two drive,......, normally 0)

FIG. 17

SD Execute (No Data)
SD Execute (read from SD Card)
SD Execute (write to SD Card)

| | 7 | 6 | 5 | 4 | 3 | 2 | 1 | 0 |
|---|---|---|---|---|---|---|---|---|
| 0 | Operation Code | | | | | | | |
| 1 | Reserved | | LUN | | RSV | Send cmd12 | Standby | ACMD |
| 2 | (B39) | | | (B45) | SD Command Index | | | (B40) |
| 3 | SD Command Argument | | | | | | | |
| 4 | | | | | | | | |
| 5 | | | | | | | | |
| 6 | | | | | | | | (B8) |
| 7 | (MSB) | | | | | | | |
| 8 | Data Transfer Length | | | | | | | |
| 9 | | | | | | | | |
| 10 | Response Type | | | | | | | (LSB) |
| 11 | Control Byte | | | | | | | |

Embedded SD™ command

'Send cmd12' shall indicate the cmd12 send to the SD card when the data transfer finished, 0 = no cmd12, 1 = send cmd12.
'Standby' shall indicate the request command send to the SD card on Stand-by State ; 0 = transfer State, 1 = Stand-by State.
'ACMD' shall indicate the request command is ACMD command ; 0 = CMD, 1 = ACMD.
'Response Type' shall indicate the response type of the SD command to be sent to the SD card.
0000 0011 : no response
0000 0100 : R1, R6 (, R4, R5)
0000 0101 : R1b
0000 0110 : R2
0000 0111 : R3

FIG. 18

Hardware Reset

|   | 7 | 6 | 5 | 4 | 3 | 2 | 1 | 0 |
|---|---|---|---|---|---|---|---|---|
| 0 | colspan=8 | Operation Code ||||||||
| 1 | colspan=4 | LUN |||| colspan=4 | Reserved ||||
| 2 | colspan=8 | Signature : 53h ('S') ||||||||
| 3 | colspan=8 | Signature : 44h ('D') ||||||||
| 4 | colspan=8 | Signature : 20h (' ') ||||||||
| 5 | colspan=8 | Signature : 43h ('C') ||||||||
| 6 | colspan=8 | Signature : 61h ('a') ||||||||
| 7 | colspan=8 | Signature : 72h ('r') ||||||||
| 8 | colspan=8 | Signature : 64h ('d') ||||||||
| 9 | colspan=8 | Control Byte ||||||||

Initialization of a Firmware and SD Card is performed.
The 1st command after reset returns a media changed error.

F I G. 1 9

Get Response

|   | 7 | 6 | 5 | 4 | 3 | 2 | 1 | 0 |
|---|---|---|---|---|---|---|---|---|
| 0 | colspan=8 | Operation Code ||||||||
| 1 | colspan=4 | LUN |||| colspan=4 | Reserved ||||
| 2 | colspan=8 | Reserved ||||||||
| 3 | colspan=8 | Reserved ||||||||
| 4 | colspan=8 | Reserved ||||||||
| 5 | colspan=8 | Reserved ||||||||
| 6 | colspan=8 | Reserved ||||||||
| 7 | (MSB) | colspan=7 | Data Transfer Length |||||||| 
| 8 | colspan=7 | |||||||  (LSB) |
| 9 | colspan=8 | Control Byte ||||||||

F I G. 2 0

Command Type : ac/bc/bcr
Response Type : No Res. (0000_0011)
· SCSI Command

Response Type : R1 / R1b / R2 / R3 / R6
· SCSI Command

Command Type : adtc(single Block.)
Single Block Read(data length <=512bytes)
· SCSI Command Single Block Write(data length <=512bytes)
· SCSI Command

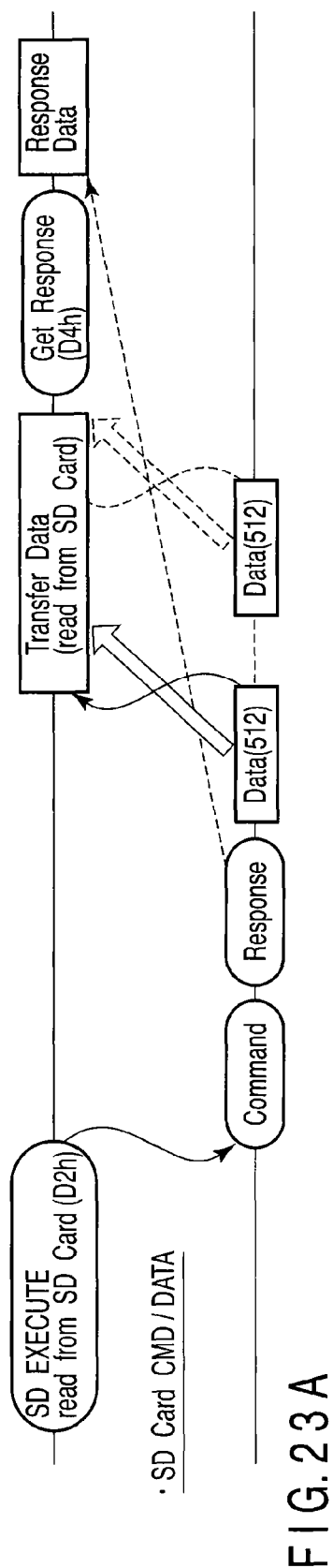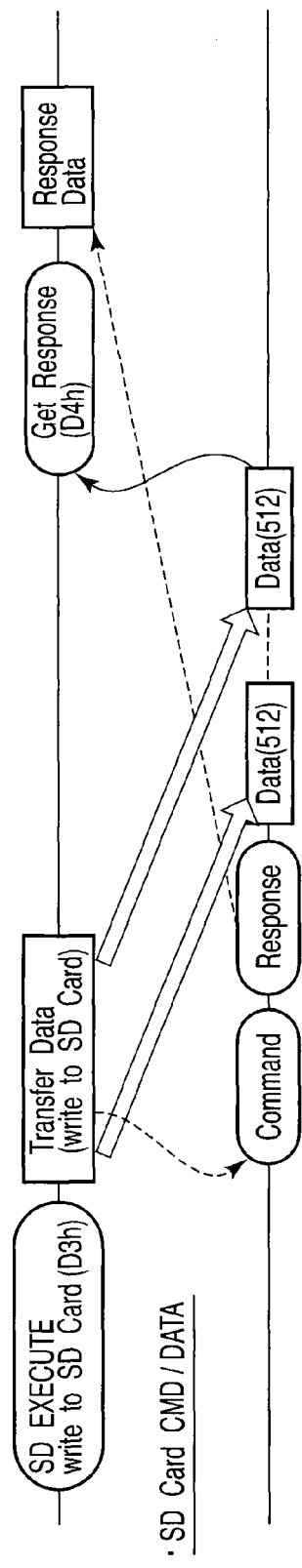
FIG. 23A
FIG. 23B

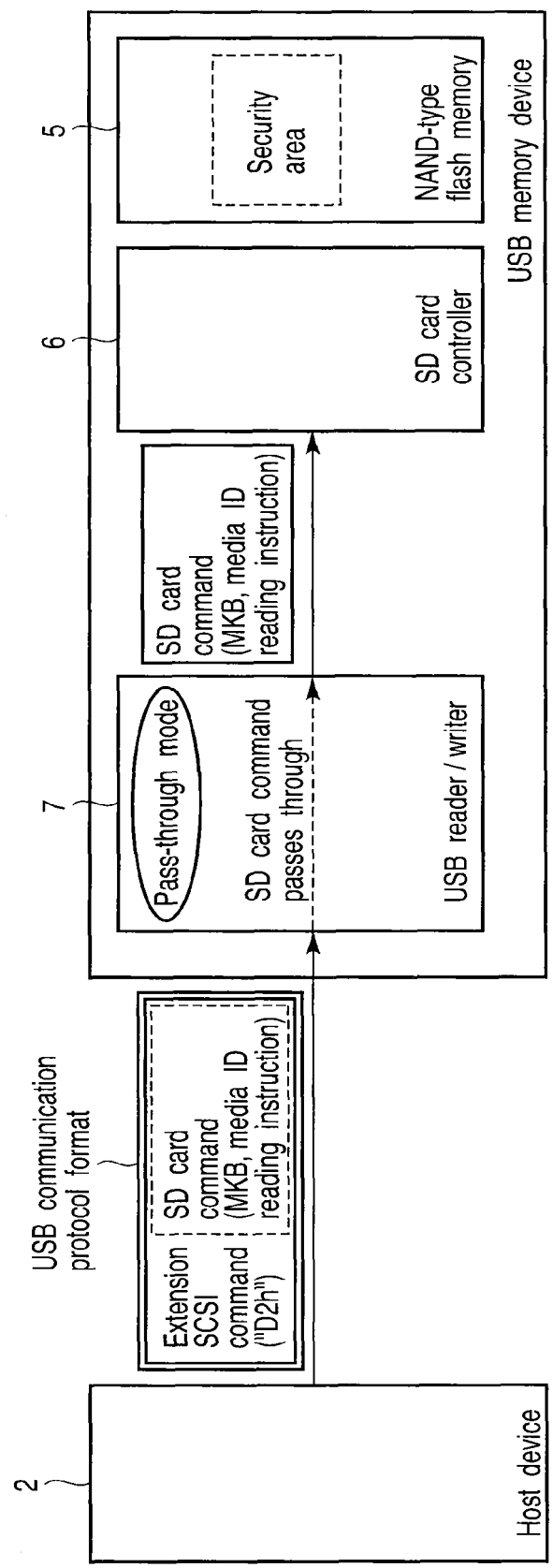
F I G. 26

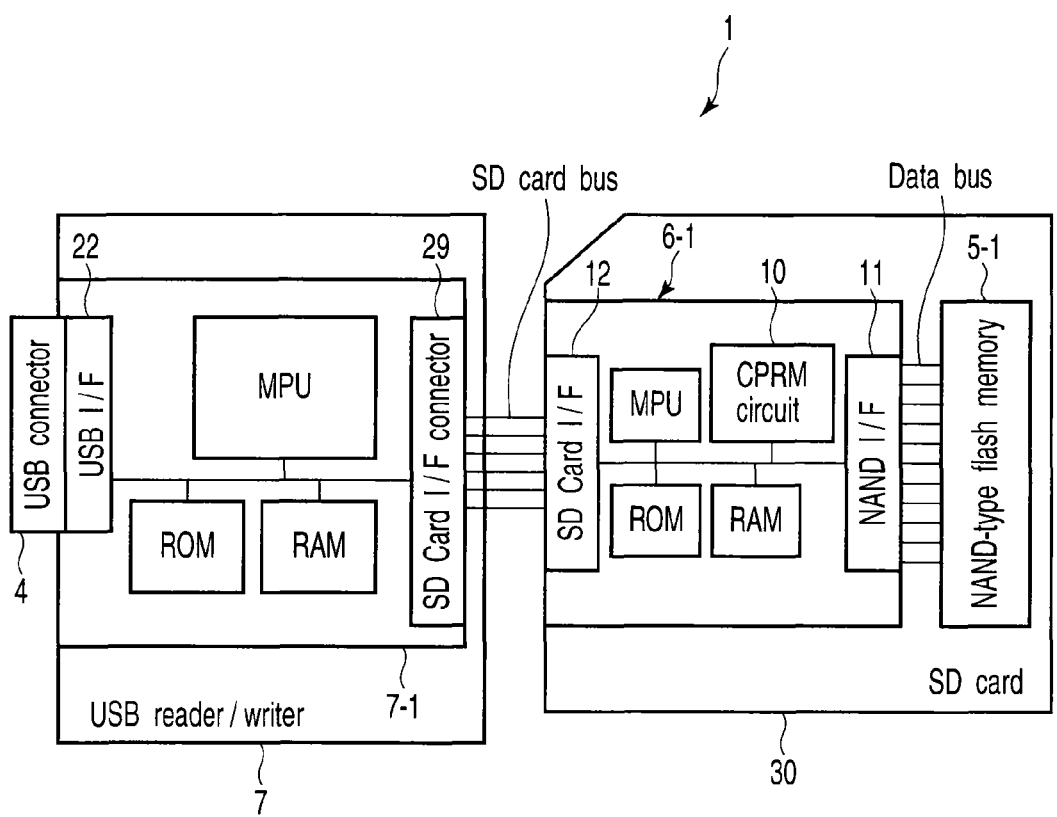
F I G. 31

SEMICONDUCTOR DEVICE WITH COPYRIGHT PROTECTION FUNCTION

CROSS-REFERENCE TO RELATED APPLICATIONS

The present divisional application claims the benefit of priority under 35 U.S.C. §120 to U.S. application Ser. No. 12/194,775, filed on Aug. 20, 2018, which claimed the benefit of priority under 35 U.S.C. §119 from prior Japanese Patent Application No. 2007-215983, filed Aug. 22, 2007. The entire contents of U.S. application Ser. No. 12/194,775 and Japanese Application No. 2007-215983 are hereby incorporated herein by reference.

BACKGROUND OF THE INVENTION

1. Field of the Invention

This invention relates to a semiconductor device. For example, it relates to a USB memory device with a copyright protection function.

2. Description of the Related Art

Recently, a universal serial bus (USB) memory using a flash memory has been widely utilized as a removable recording medium for use in a personal computer (PC).

The USB memory device, however, has no mechanism for protecting the copyright of content recorded in the USB memory device and it cannot record the content which requires copyright protection, or even if it can, the content cannot be reproduced in a PC and the like.

Jpn. Pat. Appln. KOKAI Publication No. 2003-317054 discloses a memory having a USB interface and a secure digital (SD™) interface, which can be switched between a USB function and an SD™ function. However, when using the USB function, the SD™ function is not available.

BRIEF SUMMARY OF THE INVENTION

A semiconductor device according to an aspect of the present invention includes:

a serial communication interface connector which is capable of being connected to a serial communication interface terminal of electronic equipment;

a non-volatile semiconductor memory;

a memory controller which includes a memory interface connected to the non-volatile semiconductor memory and a copyright protection function and which controls the non-volatile semiconductor memory; and a memory reader/writer which includes a controller interface connected to the memory controller and a serial communication interface connected to the serial communication interface connector.

BRIEF DESCRIPTION OF THE SEVERAL VIEWS OF THE DRAWING

FIG. 1 is a block diagram of a USB memory device according to a first embodiment of the invention;

FIG. 7 is a block diagram showing a second constitutional example of the USB memory device according to the first embodiment;

FIG. 8A is an exploded perspective view of FIG. 7 and FIG. 8B is a perspective view of a multi chip package;

FIG. 14 is a diagram showing a mode of enabling/disabling an extension command;

FIG. 15 is a diagram showing codes of extension commands;

FIG. 16 is a diagram showing the format of pass-through mode set command;

FIG. 17 is a diagram showing the format of data;

FIG. 18 is a diagram showing the format of an SD™ card execute command;

FIG. 19 is a diagram showing the format of a response get command;

FIG. 20 is a diagram showing the format of a hardware reset command;

FIG. 21A, FIG. 21B, FIG. 22A, FIG. 22B, FIG. 23A, and FIG. 23B are timing charts showing the processing example of the command;

FIG. 25 to FIG. 27 are block diagrams of the USB memories according to the second embodiment;

FIG. 31 is a block diagram of a memory system according to a modification of the first and second embodiments.

DETAILED DESCRIPTION OF THE INVENTION

First Embodiment

Figure 2:
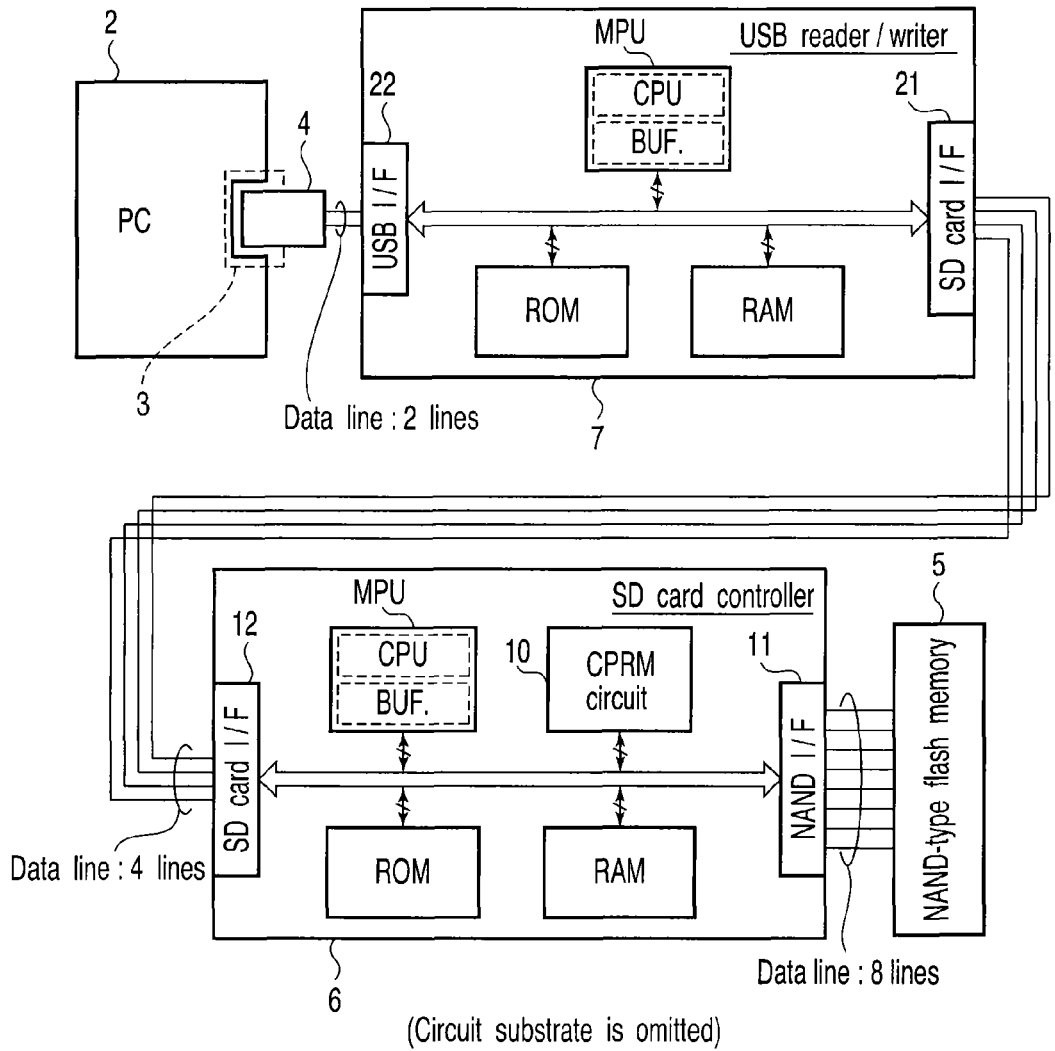
FIG. 2 is a block diagram showing one example of the USB memory device according to the first embodiment.

A first embodiment of the present invention relates to the basic structure of a semiconductor memory device.

FIG. 1 is a block diagram showing one basic example of a USB memory device with a copyright protection function according to the first embodiment of the present invention.

As illustrated in FIG. 1, a USB memory device according to the first embodiment includes a universal serial bus (USB) connector 4, a non-volatile semiconductor memory 5, a memory controller 6, and a USB reader/writer 7.

The USB connector 4 is configured to be connectable to a USB terminal 3 of electronic equipment 2.

The non-volatile semiconductor memory 5 stores data.

The memory controller 6 includes a copyright protection function (copyright protection circuit) 10, a memory interface (memory I/F) 11 connectable to the non-volatile semiconductor memory 5, and a controller interface (controller I/F) 12 connectable to the USB reader/writer 7.

The USB reader/writer 7 includes a controller interface (controller I/F) 21 connectable to the memory controller 6 and a USB I/F 22 connectable to the USB connector 4.

The USB connector 4, the non-volatile semiconductor memory 5, the memory controller 6, and the USB reader/writer 7 are arranged on the same circuit substrate 1. The non-volatile semiconductor memory has a connector (not shown) connected to the memory controller. The connector of the non-volatile semiconductor memory and the USB connector are also formed on the same circuit substrate 1.

FIG. 2 is a block diagram showing one specific example of the USB memory device with a copyright protection function according to the first embodiment of the invention.

The electronic equipment 2 here is, by way of example, a personal computer (PC). The USB connector 4 of the USB memory device is connected to the USB terminal 3 of the PC 2.

The USB connector 4 is connected to the USB I/F 22 of the USB reader/writer 7, for example, via two data lines.

The memory controller 6 is, by way of example, a secure digital (SD™) card controller. The controller I/Fs 12 and 21 are, for example, SD™ card I/F. The SD™ card I/Fs 12 and 21 are connected to each other, for example, via four data lines.

The copyright protection circuit 10 is, for example, a CPRM (Copy Protection for Prerecorded Media) circuit. The CPRM is a technology for use in copyright protection, for example, in an SD™ card.

The non-volatile semiconductor memory 5 is, for example, a NAND-type flash memory. The memory I/F 11 is, for example, a NAND interface (I/F). The NAND I/F 11 and the NAND-type flash memory 5 are connected to each other, for example, via eight data lines.

This time, the processing performed in the recording time and the reproducing time of the content requiring the copyright protection will be described in respect of the USB memory device with a copyright protection function according to this embodiment.

(Recording Time)

Figure 3:
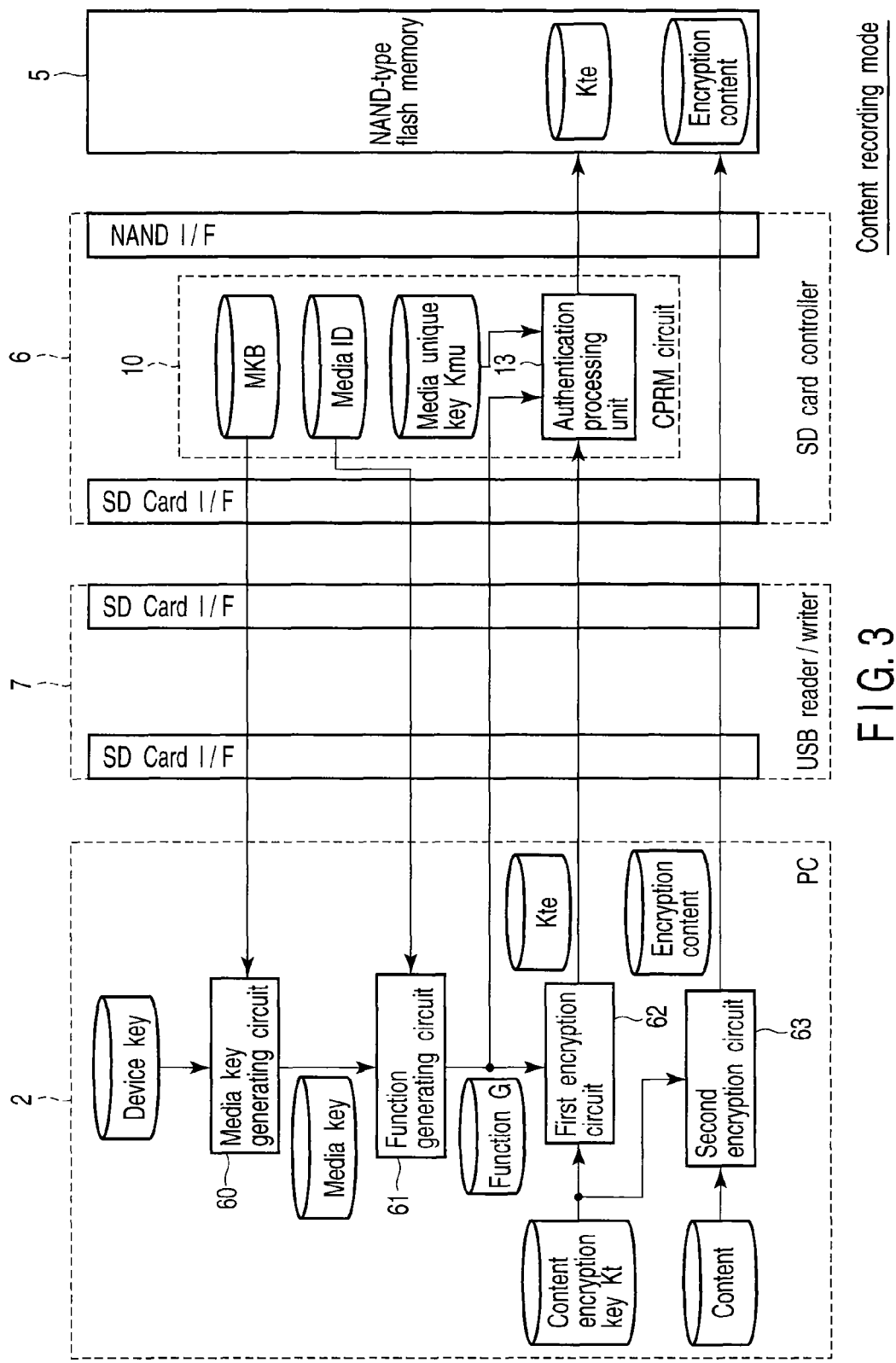
FIG. 3 and FIG. 4 are block diagrams of the USB memories according to the first embodiment, showing the state of content respectively in the recording time and the reproducing time.

At first, the processing in recording the content in the NAND-type flash memory 5 will be described using FIG. 3. FIG. 3 is a block diagram of the NAND-type flash memory 5, the SD™ card controller 6, and the USB reader/writer 7 which are included in the USB memory device, and a host device (for example, personal computer (PC)) 2 connected to the USB memory device. In FIG. 3, the USB connector 4 and the USB terminal 3 are omitted.

As illustrated, the PC 2 includes a media key generating circuit 60, a function generating circuit 61, a first encryption circuit 62, and a second encryption circuit 63. Further, the PC 2 stores a device key, a content encryption key Kt, and content to be encrypted and recorded in the NAND-type flash memory 5, in its internal memory.

The CPRM circuit 10 of the SD™ card controller 6 further includes an authentication processing unit 13. The SD™ card controller 6 stores a media key block (MKB), a media ID, and a media unique key Kmu, in its internal memory.

When recording the content, at first, the media key generating circuit 60 in the PC 2 reads out the MKB from the CPRM circuit 10 of the SD™ card controller 6. MKB is the data recorded in the CPRM circuit 10 when the SD™ card controller 6 and the NAND-type flash memory 5 are manufactured, which is the media key encrypted, i.e., the secret encryption key. The MKB is used for revocation of the host device. In other words, the host device's use of the content is controlled according to the MKB. Each host device is distinguished by each device key assigned to each host device from a viewpoint of the SD™ card controller 6.

The media key generating circuit 60 in the PC 2 performs the MKB processing using the device key stored in the PC 2 itself and the MKB read from the SD™ card controller 6. The MKB processing is performed by decoding the MKB using the device key. In the case of that the PC 2 is allowed to use the USB memory device, the PC 2 can get a media key after the decoding of the MKB. Otherwise, the PC 2 cannot get the media key or proceed to the next processing. In short, this host device is revoked.

The media key obtained by the media key generating circuit 60 is given to the function generating circuit 61. The function generating circuit 61 reads out a media ID from the CPRM circuit 10 of the SD™ card controller 6. The media ID is an ID uniquely assigned to each individual USB memory device. The function generating circuit 61 generates a predetermined function G, using the media key and the media ID.

The first encryption circuit 62 encrypts the content encryption key Kt using the function G and gets the encrypted content encryption key Kte. The second encryption circuit 63 encrypts the content using the content encryption key Kt.

The function G generated by the function generating circuit 61 and the Kte obtained by the first encryption circuit 62 are sent to the authentication processing unit 13 of the CPRM circuit 10. In the authentication processing unit 13, the authentication and key exchange (AKE) processing is performed. The AKE processing means a procedure for authenticating the other party by exchanging data between the devices sharing the secret information. In the AKE processing, a method for exchanging data can be executed by only the devices sharing the secret information. The encrypted content encryption key Kte is stored in a security area of the NAND-type flash memory 5. In order to access to the security area, it is necessary to be authenticated by the AKE processing. A media unique key Kmu is used as the shared secret information on which the AKE processing is based. The media unique key Kmu means the media ID encrypted by the media key. The authentication processing unit 13 performs the AKE processing, using the function G and the media unique key Kmu, and when the PC 2 is authenticated, it is allowed to access to the security area of the NAND-type flash memory 5. Consequently, the encrypted content encryption key Kte is stored in the hidden area of the NAND-type flash memory 5.

On the other hand, the content encrypted by the second encryption circuit 63 is recorded in the NAND-type flash memory 5 without the processing in the CPRM circuit 10. This is why the encrypted content itself is not recorded in the security area of the NAND-type flash memory 5.

According to the above, the encrypted content and the encryption key Kte necessary for decoding the above are recorded in the NAND-type flash memory 5.

(Reproducing Time)

Figure 4:
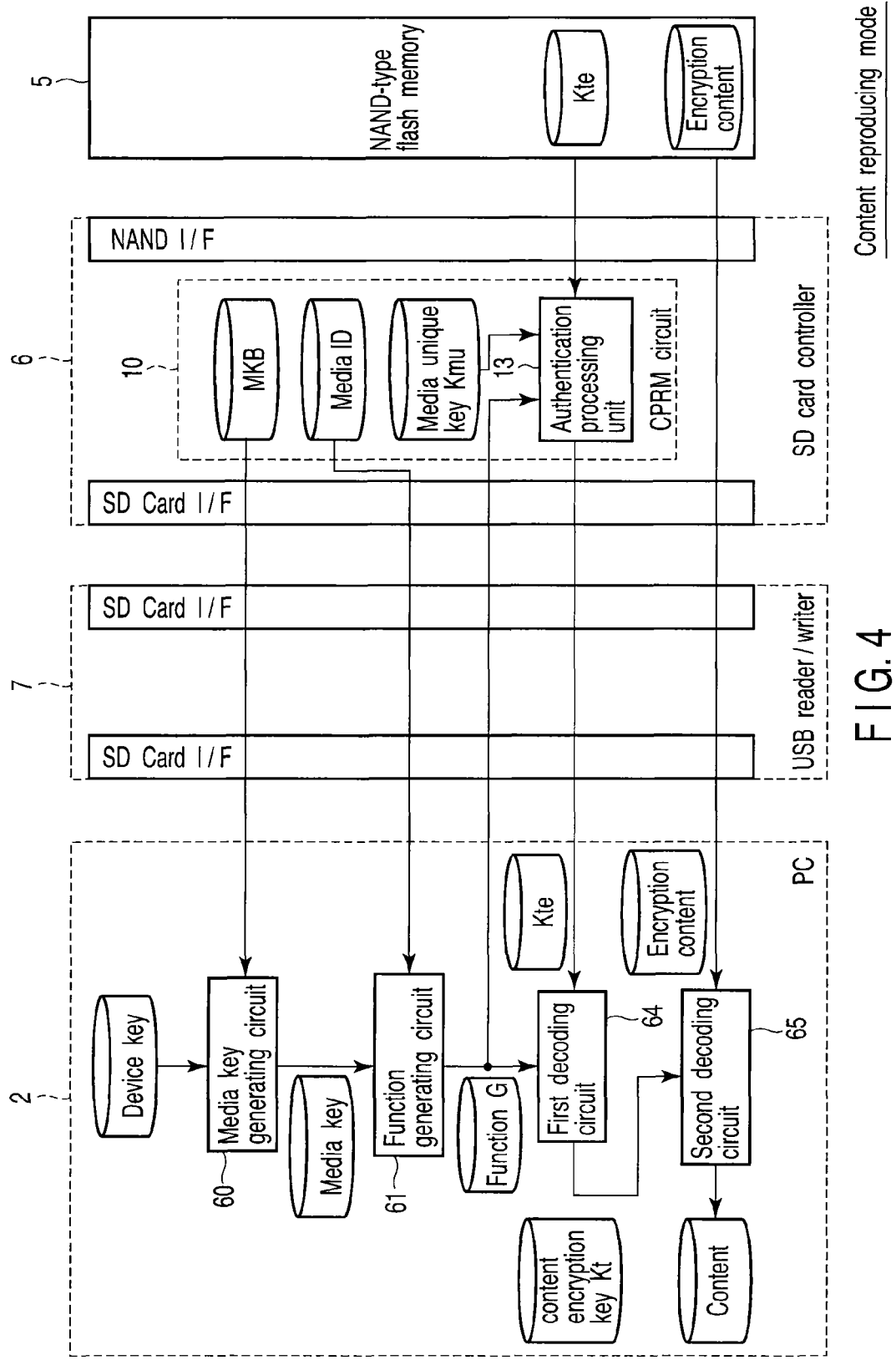

The processing in reproducing the content recorded in the NAND-type flash memory 5 will be described using FIG. 4. FIG. 4 is a block diagram of the NAND-type flash memory 5, the SD™ card controller 6, and the USB reader/writer 7 which are included in the USB memory device, and the host device 2 (for example, PC) connected to the USB memory device. In FIG. 4, the USB connector 4 and the USB terminal 3 are omitted.

Also in the reproducing time of the content, similarly to the recording time, at first, a media key is generated by the media key generating circuit 60 and a function G is generated by the function generating circuit 61. The AKE processing is performed in the authentication processing unit 13, using the function G and the media unique key Kmu. When the PC 2 is permitted to access to the memory, the content encryption key Kte read from the security area of NAND-type flash memory 5 is read by the PC 2. The encrypted content in the NAND-type flash memory 5 is read by the PC 2 without the processing by the CPRM circuit 10.

In the PC 2, a first decoding circuit 64 decodes the Kte using the function G and gets the content encryption key Kt. A second decoding circuit 65 decodes the encrypted content using the content encryption key Kt.

The content obtained as mentioned above is reproduced by the PC 2.

The media key generating circuit 60, the function generating circuit 61, the first encryption circuit 62, the second encryption circuit 63, the first decoding circuit 64, and the second decoding circuit 65 in FIG. 3 and FIG. 4 may be formed by hardware or these same functions may be provided in the CPU of the PC 2.

(First Constitutional Example)

Figure 5:
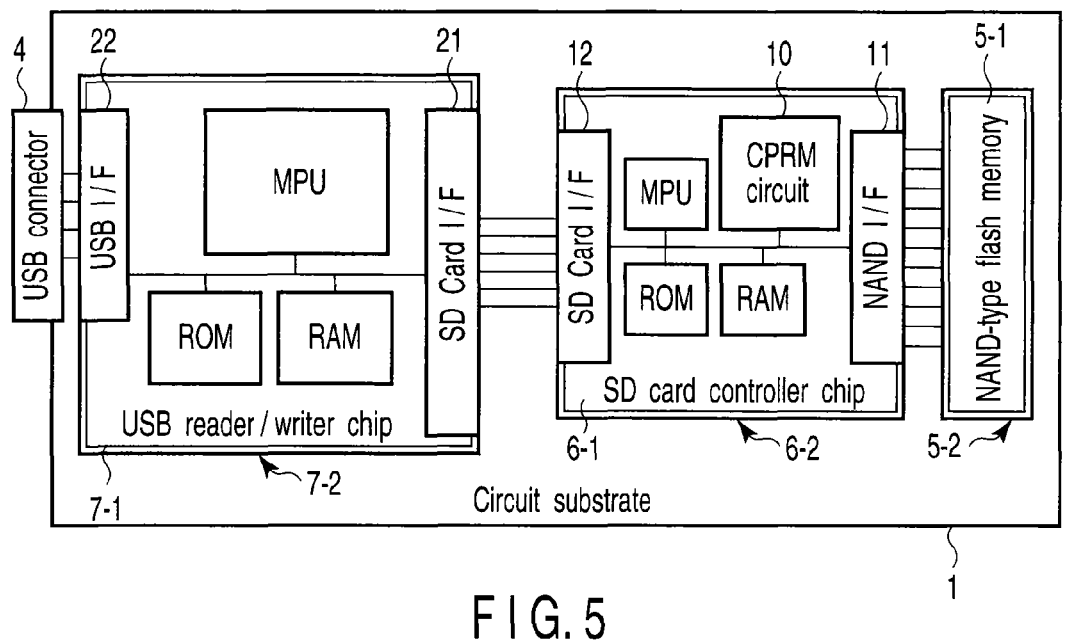
FIG. 5 is a block diagram showing a first constitutional example of the USB memory device according to the first embodiment.
Figure 6:
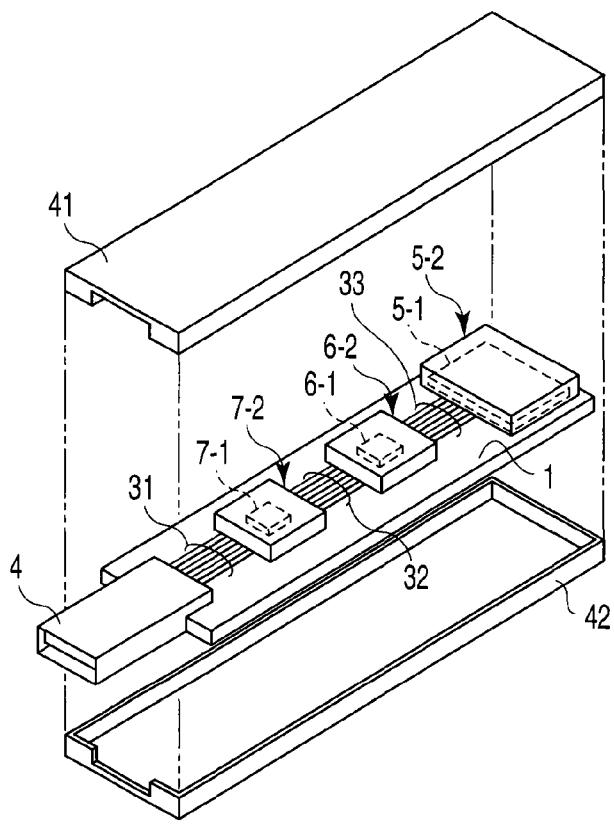
FIG. 6 is an exploded perspective view of FIG. 5.

FIG. 5 is a block diagram showing a first constitutional example of the USB memory device with a copyright protection function according to the first embodiment of the invention and FIG. 6 is an exploded perspective view of the USB memory device with a copyright protection function shown in FIG. 5.

As illustrated in FIG. 5, according to the first constitutional example, there are three semiconductor device packages on the circuit substrate 1. They are a USB reader/writer chip package 7-2 packaging a USB reader/writer chip 7-1, an SD™ card controller chip package 6-2 packaging an SD™ card controller chip 6-1, and a NAND-type flash memory chip package 5-2 packaging a NAND-type flash memory chip 5-1.

These three packages 5-2, 6-2, and 7-2 are arranged on the circuit substrate 1, as illustrated in FIG. 6.

The USB reader/writer chip package 7-2 is connected to the USB connector 4 arranged on the circuit substrate 1 via wiring 31 formed on the circuit substrate 1 and also connected to the SD™ card controller chip package 6-2 via wiring 32 formed on the circuit substrate 1. The SD™ card controller chip package 6-2 is connected to the NAND-type flash memory chip package 5-2 via wiring 33 formed on the circuit substrate 1.

As illustrated in FIG. 6, for example, the circuit substrate 1 is packaged by the upper package 41 and the lower package 42 in a way of exposing the USB connector 4 to the outside, and thereby the USB memory device is formed.

(Second Constitutional Example)

FIG. 7 is a block diagram showing a second constitutional example of the USB memory device with a copyright protection function according to the first embodiment of the invention, FIG. 8A is an exploded perspective view of the USB memory device with a copyright protection function shown in FIG. 7, and FIG. 8B is a perspective view showing an example of chip arrangement in a multi chip package.

As illustrated in FIG. 7, FIG. 8A, and FIG. 8B, the second constitutional example is different from the first constitutional example in that the NAND-type flash memory chip 5-1 and the SD™ card controller chip 6-1 are packaged in one package 5-3. The package 5-3 is a so-called multi chip package (MCP) typed semiconductor device and is referred to as an SD™ card function MCP 5-3 device in this specification.

As illustrated in FIG. 8B, the SD™ card controller chip 6-1 is arranged on the NAND-type flash memory chip 5-1 as an example chip arrangement in the MCP. Both are mutually connected via bonding wire 51.

The USB reader/writer chip package 7-2 is connected to the USB connector 4 arranged on the circuit substrate 1 via the wiring 31 formed on the circuit substrate 1 and also connected to the SD™ card function MCP 5-3 via the wiring 33 formed on the circuit substrate 1.

As illustrated in FIG. 8A, for example, the circuit substrate 1 is packaged by the upper package 41 and the lower package 42 in a way of exposing the USB connector 4 to the outside, and thereby the USB memory device is formed.

Compared with the first constitutional example, the second constitutional example has such an advantage that the USB memory device can be downsized because the circuit substrate 1 can be downsized by packaging the NAND-type flash memory chip 5-1 and the SD™ card controller chip 6-1 into one package 5-3.

(Third Constitutional Example)

Figure 9:
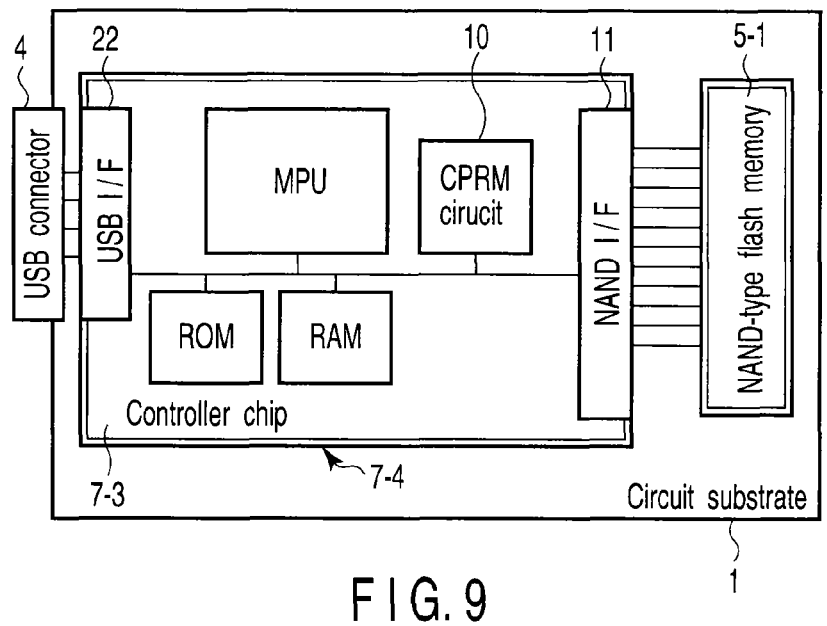
FIG. 9 is a block diagram showing a third constitutional example of the USB memory device according to the first embodiment.
Figure 10:
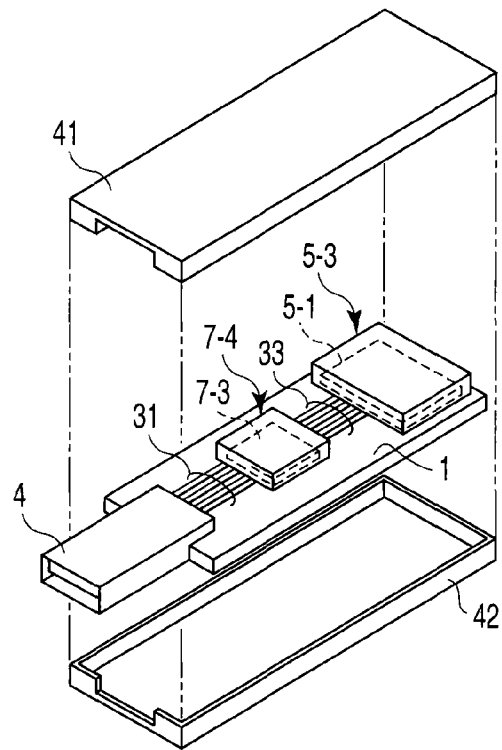
FIG. 10 is an exploded perspective view of FIG. 9.

FIG. 9 is a block diagram showing a third constitutional example of the USB memory device with a copyright protection function according to the first embodiment of the invention, and FIG. 10 is an exploded perspective view of the USB memory device with a copyright protection function shown in FIG. 9.

As illustrated in FIG. 9 and FIG. 10, the third constitutional example is different from the first constitutional example in that the function of the USB reader/writer chip 7-1 and the function of the SD™ card controller chip 6-1 are integrated into one chip 7-3 and packaged in the package 7-4. The chip 7-3 is simply referred to as a controller chip in this specification.

The controller chip 7-3 includes a USB I/F 22 and a NAND I/F 11 and the controller chip 7-3 converts the data transferred from the USB connector 4 into that one writable in the NAND-type flash memory chip 5-1. On the contrary, the controller chip 7-3 converts the data read from the NAND-type flash memory chip 5-1 into that reproducible in electronic equipment, such as PC having a USB terminal.

Compared with the first constitutional example, the third constitutional example has the same advantage; the USB memory device can be downsized easily because the number of semiconductor packages to be arranged on the circuit substrate 1 can be decreased.

According to the USB memory device according to the first embodiment, it is possible to obtain a USB memory device with a copyright protection function which can record and reproduce copyright protected content by connecting the USB reader/writer 7 to the memory controller 6 controlling the non-volatile semiconductor memory 5 with a copyright protection function.

Second Embodiment

A second embodiment relates to a logical interface on USB for making use of a copyright protection function built in the SD™ card also for the USB memory device.

The USB terminal is provided in electronic equipment such as a PC (hereinafter, referred to as a host) and is used for connecting various kinds of peripheral equipment (referred to as target) to the host through high-speed serial communication. At present, the USB terminal can be used to connect a removable recording medium such as a non-volatile semiconductor memory as the target, to the host. In the USB standard, a recording medium capable of reading and writing data directly via the USB terminal, between the target and the host, is defined as the USB mass storage class.

Data can be read from and written in a recording medium conforming to the standard of the USB mass storage class by transferring the command and data described, for example, according to the standard format of small computer system interface (SCSI), using the bulk transfer by the USB interface (USB I/F) between the host and itself. In the recording medium conforming to the standard of the USB mass storage class, the data can be directly written from the host and directly read out to the host without using a card reader or any special software. As the command described according to the standard format of SCSI, there is, for example, an SCSI block device command, and an AT Attachment (ATA) block read/write command is well known. In this specification, the commands described according to the standard of SCSI are all referred to as an SCSI command.

The SCSI command of the USB mass storage class provides an access means for directly writing data in a recording medium connected to the host via the USB terminal or directly reading data therefrom. The current SCSI command is designed to provide the access means for directly writing and reading data from the host with respect to the usual user data of the recording medium. The current SCSI command does not provide an access means to a copyright protection function, for example, an access means to the CPRM function included in the SD™ card.

In order to provide the access means to a copyright protection function, this embodiment provides an operation mode for exclusive use in access to the copyright protection function, in a recording medium conforming to the standard of the USB mass storage class, for example, in a non-volatile semiconductor memory card conforming to the standard of the USB mass storage class.

The logical interface on the USB has to be devised in order to realize the operation mode for exclusive use in access to the copyright protection function.

Hereinafter, some examples of the devised logical interfaces that realize the above exclusive operation mode will be described as the second embodiment.

(First Logical Interface Example)

The logical interface according to a first example is an example which can be applied to the USB memories according to the first and second examples in the first embodiment.

In this example, there is prepared an operation mode for exclusive use in direct access to the memory controller from the host via the USB reader/writer.

In the exclusive operation mode, commands and data transmitted from the host are transferred through the USB reader/writer in the USB memory device to the memory controller, for example, the SD™ card controller. This exclusive operation mode is hereinafter referred to as "pass-through mode" in this specification.

In this example, a new command is prepared in order to enable the exclusive operation mode. This new command will be later described in detail.

Figure 11:
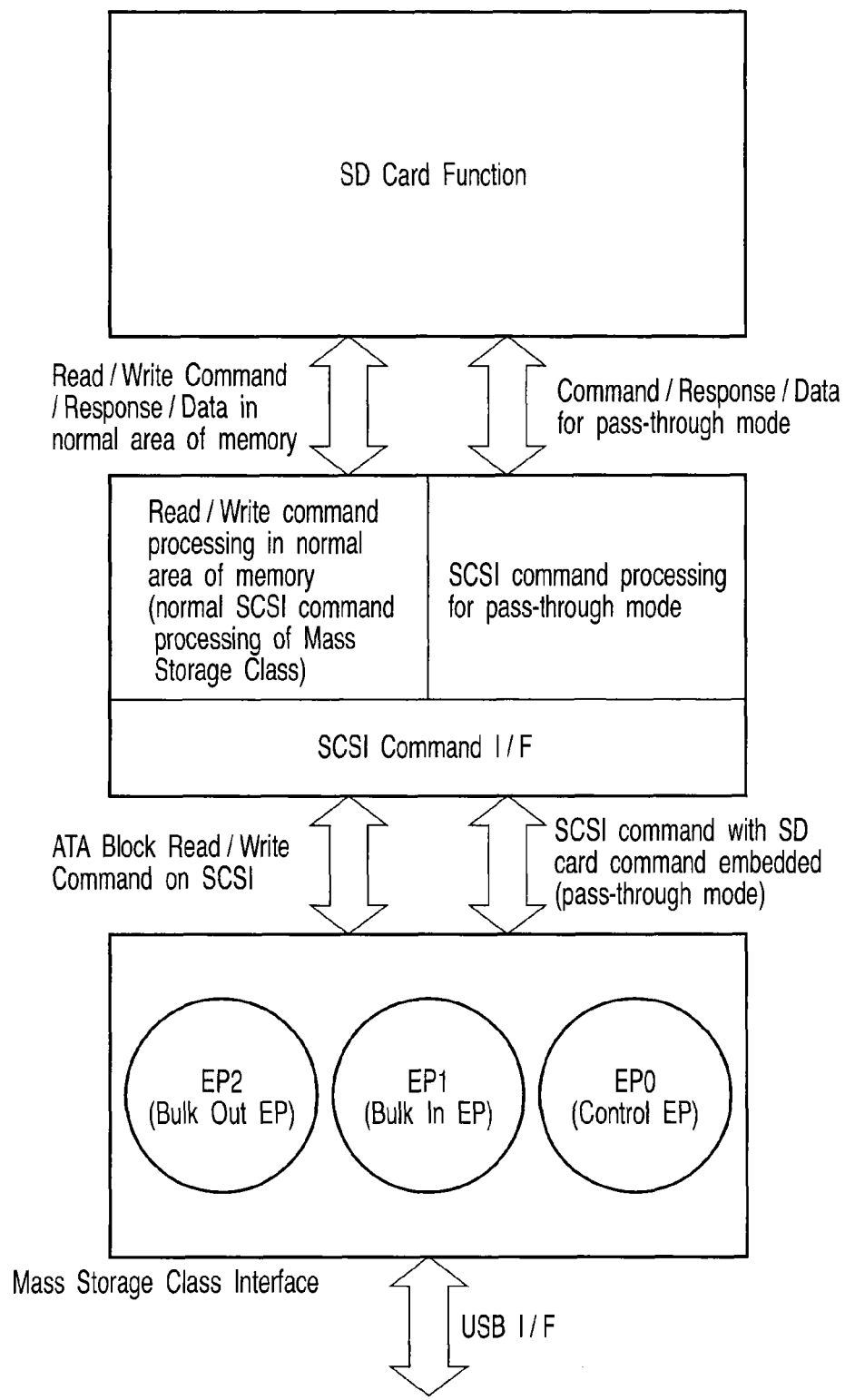
FIG. 11 is a concept view showing a first logical interface example of a USB memory device according to a second embodiment of the invention.

FIG. 11 is a view showing the first logical interface example of the USB memory device according to the second embodiment of the invention. The logical interface shown in FIG. 11 is defined at a communication interface of the target (USB memory device), not the host. This communication interface is loaded on the USB reader/writer of the USB memory device according to the embodiment.

As illustrated in FIG. 11, when the USB memory device according to the embodiment is connected to, for example, the USB terminal of the host, an end point (EP) is recognized as the mass storage class interface in the communication interface, similarly to the general USB memory device. In this example, three end points, EP0 to EP2, are prepared in the mass storage class interface. The term "end point" refers to a theoretical minimum unit of communication passage for connecting between the USB memory device and the host device and is specified by the USB standard.

The end point EP0 is a control end point (control EP). That is, the end point EP0 is used for control of the USB device in, for example, configuration of the USB device, and can execute only control transfer.

Contrary to this, transfer of the SCSI command, data and response is all carried out using the end points EP1, EP2 to enable bulk transfer. Of them, the end point EP1 is an end point for downstream (bulk in EP). Data and SCSI commands transferred from the host device 10 to the target (USB memory device) are sent by bulk transfer and set to the end point EP1. The end point EP2 is end point for upstream (bulk out EP), in which for example, data transferred from the target (USB memory) to the host device 10 is set.

As the SCSI command of this example, as well as ordinary commands for use in the USB memory device, for example, the aforementioned ATA block read/write command, the command for exclusive use in pass-through mode is defined as an extension command of the SCSI command. The extension command is the SCSI command in which a memory controller command, for example, an SD™ card command, is embedded. The embedded memory controller command is a command for enabling the copyright protection function, and, for example, in case of the SD™ card command, the embedded command becomes a command (command for copyright protection) for enabling the CPRM function in the SD™ card controller. An example of an embedded command is shown in FIG. 12.

Figure 12:
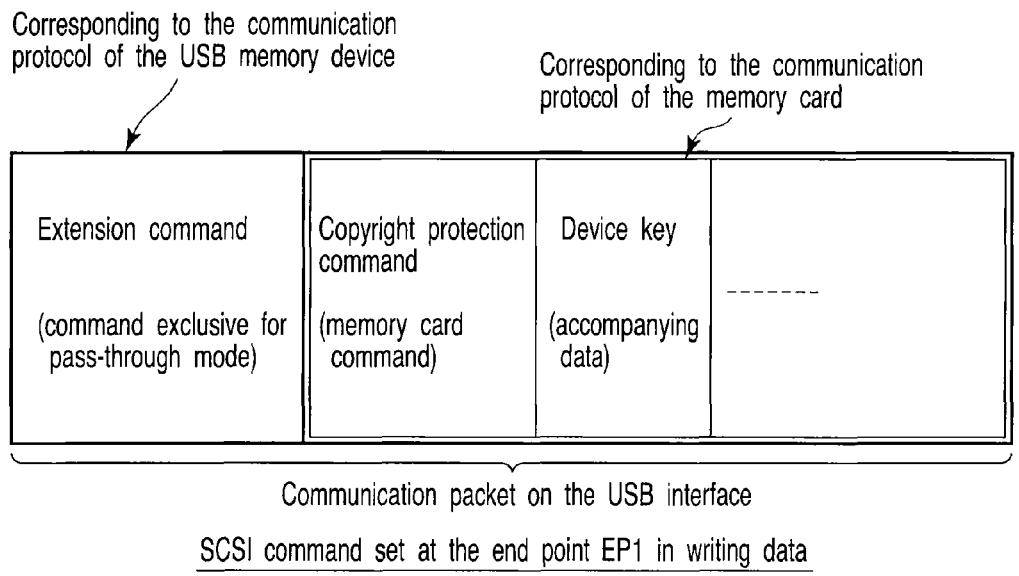
FIG. 12 is a concept view showing one example of an SCSI command set at an endpoint EP0 in the writing data.

FIG. 12 shows an example of the SCSI command set for the end point EP1 in the writing data. A communication packet on the USB interface shown in FIG. 12 is set at the end point EP1. In this example, the extension command (exclusive command for pass-through mode) is written in the communication packet, and the command and data (command for copyright protection, device key, and so on) is embedded in the communication packet. The communication packet conforms to the communication protocol of the USB memory device. The extension command is described according to the SCSI format and the extension command can be read out by the USB reader/writer. On the contrary, the embedded command (SD™ card command) conforms to the communication protocol different from the communication protocol of the USB memory device; in this example, the communication protocol of the memory card. The embedded command can be read out by the memory controller.

When the USB reader/writer in the USB memory device reads out the extension command to enable the pass-through mode, the USB reader/writer enables the pass-through mode. When the pass-through mode is enabled, thereafter, transfer of commands, data, and responses in the pass-through mode becomes possible and the SD™ command embedded in the extension command is transferred to the memory controller, for example, the SD™ card controller, passing through the USB reader/writer.

Figure 13:
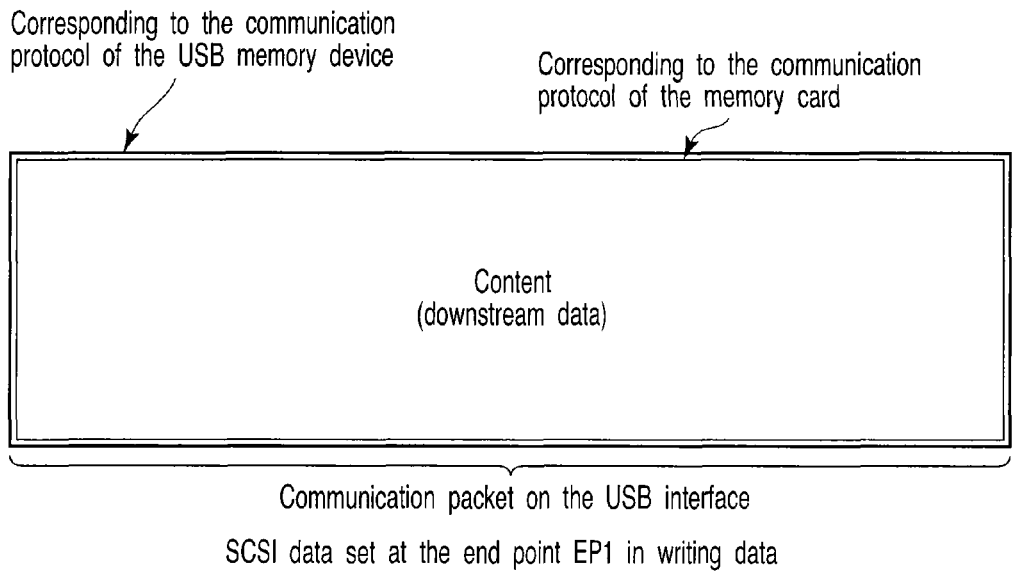
FIG. 13 is a concept view showing one example of SCSI data set at the endpoint EP1 in the writing data.

When the SD™ card controller reads out the command for copyright protection, which passes through the USB reader/writer, the copyright protection function in the SD™ card controller starts and, for example, access to the CPRM function in the SD™ card controller is granted. The data accompanying the command for copyright protection is also embedded in the communication packet in addition to the command for copyright protection. The representative example of the accompanying data is the device key described in the first embodiment. Downstream data is the data accompanying the command for copyright protection. FIG. 13 shows one example of downstream data.

FIG. 13 shows one example of the SCSI data (SCSI downstream data) set at the end point EP1 in the writing data. The SCSI data shown in FIG. 13 is the copyright protected content to be transferred to the USB memory device. The content is embedded in one communication packet on the USB interface in the example. Although the communication packet itself conforms to the communication protocol of the USB memory device, the content of the example conforms to the communication protocol of the memory card. When the pass-through mode is enabled, the content embedded in the communication packet is transferred, passing through the USB reader/writer, to the memory controller, for example, the SD™ card controller.

The command for copyright protection and the data accompanying the command for copyright protection (in the example, the device key and the content) are transferred to the SD™ card controller, passing through the USB reader/writer. When the SD™ card controller receives the command and data, the SD™ card controller encrypts the content based on the device key, media key block (MKB), and media ID, as described in the first embodiment. Thereafter, the SD™ card controller writes the encrypted content in the non-volatile semiconductor memory, for example, the NAND-type flash memory.

A more detailed example of the above operation will be described hereinafter.

The SCSI command and data (downstream data) set at the end point EP1 are transferred from the mass storage class interface to the SCSI command interface. The data (upstream data) and response from the USB memory device according to the embodiment are set at the end point EP2 from the memory card, in this example from the SD™ card via the SCSI command interface.

When the SCSI command set at the end point EP1 is a normal command, for example, an ATA block read/write command, the SCSI command interface performs the SCSI command processing according to the normal mass storage class. The USB memory device according to the embodiment has a memory card, for example, an SD™ card, as a recording medium. The SCSI command interface in this example converts the command and data described conforming to the standard format of the SCSI into the command (SD™ card command) and data for access to the memory card, for example, a memory area of the SD™ card. When the SCSI command is the normal command, for example, an ATA block read/write command, the copyright protection function is not used. Therefore, the data (downstream data) set at the end point EP1 is directly recorded in, for example, the memory area of the SD™ card.

As mentioned above, when the normal SCSI command is set at the end point EP1, the USB memory device according to the embodiment operates according to the normal SCSI command similarly to the general USB memory device. The USB memory device according to the embodiment can be used in the same way as the general USB memory device. The operation when the normal SCSI command is set is the same as that of a general USB memory device.

In contrast, when the SCSI command set at the end point EP1 is the extension command, for example, a command for exclusive use in pass-through mode, the SCSI command interface performs the SCSI command processing for the pass-through mode. Namely, the SD™ card command embedded in the SCSI command is taken out and transferred to the SD™ card controller. This enables the SD™ card controller to have access to the security area of the NAND-type flash memory.

The extension command, for example, the command for exclusive use in pass-through mode can be obtained, for example, by defining a vender unique command according to the SCSI protocol. The USB reader/writer can obtain a function of enabling the operation (pass-through operation) of directly transferring the commands and data to the memory card, for example, the SD™ card, by supporting the vendor unique command.

The logical interface of the USB memory device according to the embodiment has a first access mode of having access to the normal data area defined in the above communication interface, and a second access mode of having direct access to a copyright protection function in the non-volatile semiconductor memory. In other words, the above logical interface includes an interface used for the first access mode and an interface used for the second access mode.

The above logical interface converts a command for use in the USB into a command for use in an electric interface included in the non-volatile semiconductor memory in the first access mode, and accesses to the non-volatile semiconductor memory according to the converted command. On the other hand, in the second access mode, the logical interface accesses directly to the non-volatile semiconductor memory according to the command for use in the USB.

Hereinafter, an example of the extension command will be described. The recording medium of the USB memory device in this example is the SD™ card. The extension command according to the example can be applied to an example of another logical interface describe later, as well as to the example of the first logical interface.

FIG. 14 is a view showing an example of a mode for enabling/disabling the extension command, and a table showing whether each of the normal SCSI command (Normal Command) and the extension SCSI command (Extension Command) is enabled or not in each media type (Media Type).

As illustrated in FIG. 14, the normal SCSI command is enabled when the media type is the SD™ card or other media compatible with the SD™ card.

Further, the extension SCSI command is enabled when the media type is the SD™ card, other media compatible with the SD™ card, or media similar to the SD™ card (Illegal Media).

As mentioned above, the normal SCSI command itself is not performed on the SD™ card controller but is converted into the SD™ card command by the USB reader/writer and then executed, while the SD™ card command embedded in the extension SCSI command is directly performed on the SD™ card controller by passing through the USB reader/writer.

Next, specific examples of the extension SCSI commands will be described using FIG. 15. FIG. 15 is a view showing a relation between each extension SCSI command and each operation code.

As illustrated in FIG. 15, the following seven codes (Command Code) are defined in the extension SCSI commands according to an example.

(1) Pass-through mode set command (SD™ Card Passthrough Mode)
    operation code "D0h"
(2) SD™ card execute command without data (SD™ Execute (No Data))
    operation code "D1h"
(3) SD™ card execute command with read (SD™ Execute (read from SD™ Card))
    operation code "D2h"
(4) SD™ card execute command with write (SD™ Execute (write to SD™ Card))
    operation code "D3h"
(5) Response get command (Get Response)
    operation code "D4h"
(6) Reserved command (Reserved)
    operation code "D5h"
(7) Hardware reset command (SD™ Hardware Reset)
    operation code "D6h"

In this embodiment, the "h" after each numeral shows the hexadecimal of the numeral. For example, the operation code "D0h" is described as "1101_0000" in binary notation.

Of the extension SCSI commands, the pass-through mode set command is a command for changing the USB reader/writer from the normal operating mode to the pass-through mode. As the operation code, "D0h" is used and this "D0h" is given to the USB reader/writer in the USB memory device from the host device 10.

The SD™ card execution command without data, SD™ card execution command with read and SD™ card execution command with write are commands for accessing the SD™ card without accompanying data or by accompanying data. As the operation code, "D1h", "D2h", "D3h" are used and those are given from the host device to the USB reader/writer in the USB memory device.

The reservation command is allocated to codes of illegal commands.

The hardware reset command is a command for initialization of the SD™ card and its firmware and as the operation code, "D6h" is used.

Next, an example of the format of each command will be described with reference to FIG. 16 to FIG. 20. FIG. 16 to FIG. 20 are conceptual diagrams showing the format of each command and each row of each diagram shows 1-byte data, while a numeral indicated on the abscissa axis indicates the bit position of each 1-byte data.

<Pass Through Mode Set Command>

FIG. 16 is a conceptual diagram showing an example of the format of the pass-through mode set command. When the USB memory device is started, the pass-through mode is disabled. That is, the USB memory device is in the normal operating mode. In this case, when the USB memory device receives a command codes other than the command code "D0h", the USB memory device sends back "illegal command error". That is, USB memory device does not recognize any extension command other than "D0h".

As shown in FIG. 16, "D0h" indicating the pass-through mode set command is set at a head byte (0 byte position) of the pass-through mode set command as an operation code. To disable the pass-through mode, "0000" ("0h") is set in the command mode and to enable the pass-through mode, "0001" ("1h") is set. If with the command mode set to "0001", the pass-through mode set command (code "D0h") is executed, the pass-through mode is changed from disable to enable in the USB memory device. As a result, the pass-through mode is enabled so that the USB memory device becomes capable of executing codes "D1h" to "D6h". In FIG. 16, "LUN" indicates a logic drive for use and "Control Byte" is a predetermined value to be given to the command format.

<Response>

FIG. 17 shows an example of the format of the response. The response is a signal which is given from the SD™ card corresponding to a response acquisition command and has a meaning of acknowledgement to a command. The relation between the response acquisition command and response will be described later.

The response is exchanged between the host device and the USB memory device according to the format shown in FIG. 17. In FIG. 17, "WP" indicates presence/absence of write protect and when WP="0", write is permitted, while when WP="1", write is prohibited. "Media type" indicates the type of media, shown in FIG. 14, which sends back the response. When Media Type="0", it indicates that medium is not present and when Media Type="1", it indicates that the media is an SD™ card. When Media type="2", it indicates that the media is compatible with the SD™ card. When Media type="3", it indicates that the media is an illegal media which resembles an SD™ card. A relative card address (RCA) is held at the $6^{th}$ and $7^{th}$ byte. The RCA is a value which the SD™ card sets up itself at the time of initialization of the SD™ card and used as an input parameter for part of the SD™ card command. "Max LUN Number" indicates the number of logic drives.

<SD™ Card Execution Command>

FIG. 18 shows an example of the format of the SD™ card execution command without data, SD™ card execution command with read and SD™ card execution command with write. If these commands are not classified, they are called simply SD™ card execution commands.

The SD™ card execution command is a command which executes some processing by accessing the SD™ card actually. As described above, under the pass-through mode, the SD™ card command is buried in the extension SCSI command and transferred directly to the SD™ card controller. The SCSI command in which this SD™ card command is to be buried is the SD™ card execution command.

As shown in FIG. 18, an operation code is set at the first 0 byte position. If no data is required for accessing the SD™ card controller, as the SD™ card execution command without data, "D1h" is set up. To access the SD™ card controller for reading data, as the SD™ card execution command with read, "D2h" is set up. To access the SD™ card controller for writing data, as the SD™ card execution command with write, "D3h" is set up.

"Send cmd12", "Standby" and "ACMD" are set at lower three bits in next 1 byte position. These are pieces of information indicating how to transfer the SD™ card command buried in the command to the SD™ card controller.

"Send cmd12" is information indicating whether a predetermined command cmd12 supported by the SD™ card 30 is to be executed in the SD™ card in which execution of a command is completed. The command cmd12 is a command indicating that multi-block transfer to the SD™ card by the host device is ended. The block mentioned here is a group of memory cells which hold data in the NAND type flash memory 5 and data held by memory cells in the same block is collectively erased.

"Standby" is information indicating a request command to the SD™ card in the standby state.

"ACMD" indicates whether the request command is ACMD for a special purpose. The command for the special purpose is a command which accesses, for example, a lock/unlock function or copyright protection function. Thus, if the request command is a command for the special purpose, ACMD="1" and if it is a normal command, ACMD="0".

Then, the SD™ card command is buried in the lower six bits of the $2^{nd}$ bit and $3^{rd}$ to $6^{th}$ bytes position. The SD™ card command contains "SD™ command index", which indicates the content of a command (read, write, and the like) and "SD™ Command Argument", which indicates information (address and the like) necessary for executing that command.

Data ("Data Transfer Length") required for execution of a command such as reading data and writing data are held at $7^{th}$ to $9^{th}$ bytes position. As mentioned in the first embodiment, for example, when the security area of the NAND-type flash memory is accessed, MKB, media key, function G, Kte, and the like are set in this "Data Transfer Length".

"Response type" indicates a response type to be sent to the SD™ card. As the response type, "R1", "R1b", "R2" to "R6" are prepared. The details of such will be given later. If "response type" is "0000_0011", no response is sent ("No Res") and if "0000_0100", "R1", "R4" to "R6" are selected.

If "0000_0101", "R1b" is selected, if "0000_0110", "R2" is selected and if "0000_0111", "R3" is selected.

<Hardware Reset Command>

FIG. 19 shows an example of the format of the hardware reset command.

As shown in FIG. 19, "D6h" is set at the first 0 byte position as an operation code.

<Response Get Command>

FIG. 20 shows an example of the format of the response get command.

As shown in FIG. 20, "D4h" is set at the first 0 byte position as the operation code.

Hereinafter, the relation between the response get command and the response will be described. Under the pass-through mode, SD™ card command passes through the USB reader/writer and is sent directly to the SD™ card controller. On the other hand, at an operation mode other than when the pass-through mode is selected, the SCSI command is converted to a command readable by the SD™ card controller in the USB reader/writer and sent into the SD™ card controller.

Some commands of the SD™ card request for a response to a command, and other commands do not request a response. However, such an action is not expected under a normal SCSI command. Therefore, if a command which requests for a response is sent to the SD™ card 30, a response output from the SD™ card controller is enclosed, for example, between the SD™ card controller and the USB reader/writer. If the response is enclosed inside of the USB memory device, the action of the USB memory device might be unstable or the USB memory device might malfunction.

To eliminate such a fear, in this example, a response get code (Get Response) is defined in one extension. Thus, the response get code is defined in one of the extension commands and the defined response get code is sent to the USB reader/writer. Consequently, a response output from the SD™ card controller is never enclosed inside of the USB memory device, so that the response can be sent from the SD™ card controller to the host device through the USB reader/writer and the USB connecter. Consequently, an advantage of eliminating one of the causes which make the operation of the USB memory device unstable or the USB memory device malfunction can be secured.

Figure 21A:
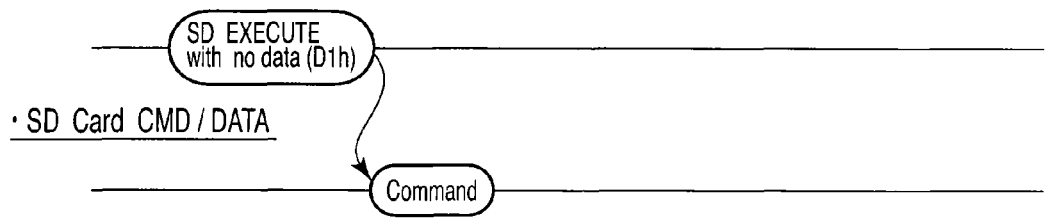

FIG. 21A is a view showing an example of command processing for a command which does not request the SD™ card for any response.

As the type of the command which does not request for any response, addressed (point-to-point) commands (ac) and broadcast commands (bc) are available. The response type of these commands is "No Res". That is, in the format shown in FIG. 18, the "Response Type" is "0000_0011".

When the SD™ card execution command without data (SD™ EXECUTE with no data: "D1h") with "No Res" is sent from the host device to the USB memory device as shown in FIG. 21A, only that command is sent to the USB memory device. The USB reader/writer of the USB memory device which receives that command transfers the SD™ card command (Command) embedded in the received SCSI command to the SD™ card controller. The processing is ended here.

On the other hand, as the type of a command which requests for a response, broadcast commands with response (bcr) is available. The response type of this command includes the aforementioned "R1", "R1b", "R2" to "R6" and the like. As for these response types, "R1" is a normal response, "R1b" is a normal response capable of optionally transferring a busy signal to a data line, "R2" is a response sent from a card identification number register (CID) or card specific data register (CSD) within the SD™ card controller, "R3" is a response sent from an operation conditions register (OCR) within the SD™ card controller, "R4" and "R5" are responses attached to an illegal media which resembles the SD™ card, and "R6" is a response sent form a relative card address register (RCA) within the SD™ card. In this specification, the response types "R1" to "R6" are generally called "With Res" and their details are omitted.

Figure 21B:
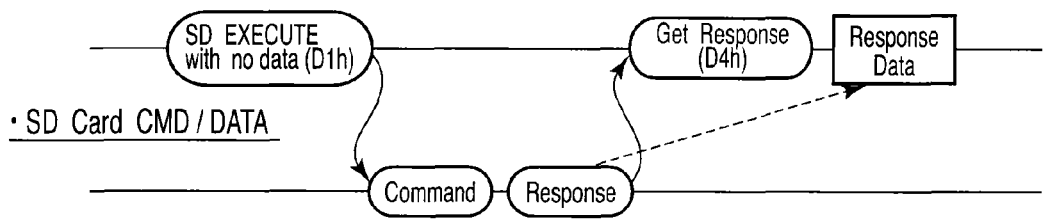

FIG. 21B is a diagram showing an example of command processing for a command which requests the SD™ card for a response. Although the response types "R4" and "R5" are not shown because FIG. 21B shows an example of using the SD™ card as a recording medium of USB memory device, the processing example for the response types "R4" and "R5" is the same as in FIG. 21B.

As shown in FIG. 21B, when the SD™ card execution command without data (SD™ EXECUTE with no data: "D1h") with the "With Res" is sent to the USB memory device from the host, a response get command (Get Response: "D4h") is sent after that command is sent. The related processing example will be described.

The USB reader/writer which receives the command ("D1h") with "With Res" transfers the SD™ card command (Command) embedded in the received SCSI command to the SD™ card controller. After the SD™ card controller executes a processing following the received SD™ card command, the SD™ card controller sends back a response. To get this response from the USB memory device, the response get command (Get Response: "D4h") is sent to the USB memory device from the host. The USB reader/writer which receives the response get command fetches the response returned from the SD™ card controller following the received command and sends the fetched out response (Response Data) to the host. The processing is ended here.

As a further command type, addressed (point-to-point) data transfer commands (adtc) is available. Specific examples of adtc are the SD™ card execution command with read and SD™ card execution command with write. Further, when the command type is adtc, a response is requested.

Figure 22A:
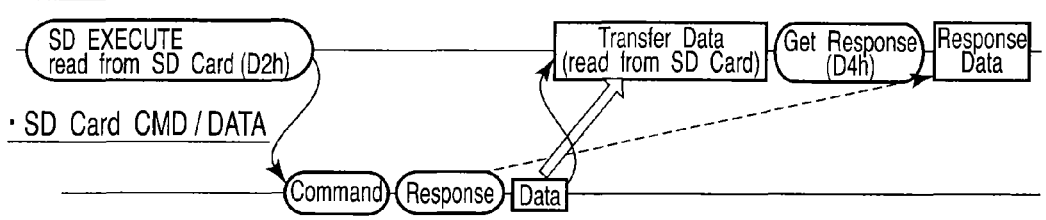

FIG. 22A is a diagram showing an example of command processing for the SD™ card execution command with read (single block read). As shown in FIG. 22A, when the SD™ card execution command with read (SD™ EXECUTE read from SD™ card: "D2h") is sent to the USB memory device from the host, the response get command (Get Response: "D4h") is sent after that command is sent.

The USB reader/writer which receives, for example, the SD™ card execution command with read transfers the SD™ card command (Command) embedded in the received SCSI command to the SD™ card controller. The SD™ card controller executes data reading from the non-volatile semiconductor memory following the received SD™ card command. After that, the SD™ card controller sends back the response and sends data read from the non-volatile semiconductor memory to the USB reader/writer. The USB reader/writer sends the received data (Transfer Data (read from SD™ card)) to the host. After sending of the received data is ended, the response get command (Get Response: "D4h") is sent from the host to the USB memory device. The USB reader/writer which receives the response get command fetches out a response sent back from the SD™ card controller following the received command, and the fetched out response (Response Data) is sent to the host. The processing is ended here.

Figure 22B:
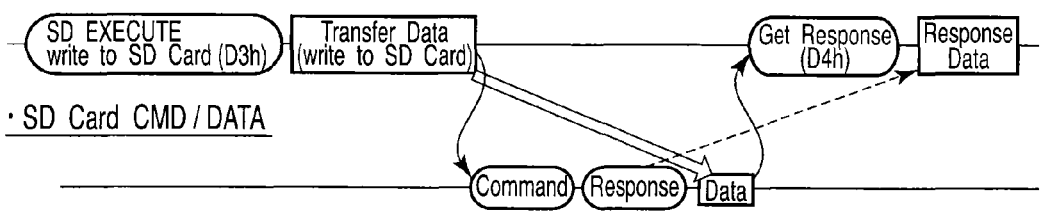

FIG. 22B is a diagram showing an example of command processing for the SD™ card execution command with write (single block write). When the SD™ card execution command with write (SD™ EXECUTE write to SD™ Card: "D3h") is sent to the USB memory device from the host as shown in FIG. 22B, the response get command (Get Response: "D4h") is sent after write data (Transfer Data (Write to SD™ Card)) subsequent to that command is sent.

For example, the USB reader/writer which receives the SD™ card execution command with write and write data transfers the SD™ card command (Command) embedded in the received SCSI command and the write data (Data) to the SD™ card controller. The SD™ card controller sends back the response and executes writing of the write data to the non-volatile semiconductor memory following the received command. After the writing is ended, the USB reader/writer sends the response get command (Get Response: "D4h") to the SD™ card controller. The USB reader/writer fetches out the response returned from the SD™ card controller following the received command and sends the fetched out response (Response Data) to the host. The processing is ended here.

FIG. 23A is a diagram showing an example of command processing for the SD™ card execution command with read (multiple block read).

The processing example shown in FIG. 23A is different from the processing example shown in FIG. 22A in that the processing example shown in FIG. 22A is single block read while the processing example shown in FIG. 23A is multiple block read. In the single block read, the data length of read data is equal to or less than the block size of the SD™ card, and the data read is done in a single block. Contrary to this, in the multiple block read, the data length of read data exceeds the block size of the SD™ card and the data read extends over plural blocks. This example indicates that the block size of the SD™ card is 512 bytes. The multiple block read is different from the single block read in that the read data is transferred from the SD™ card controller to the USB reader/writer dividedly, i.e., not in one go, but is otherwise the same as in the single block read.

FIG. 23B is a diagram showing an example of command processing for the SD™ card execution command with write data (multiple block write).

In the processing example shown in FIG. 23B, the processing example shown in FIG. 22B, which is single block write, is changed to multiple block write. This example is different from the processing example shown in FIG. 22B in that data write is of multiple block write, but is otherwise the same as in the single block write.

Figure 24:
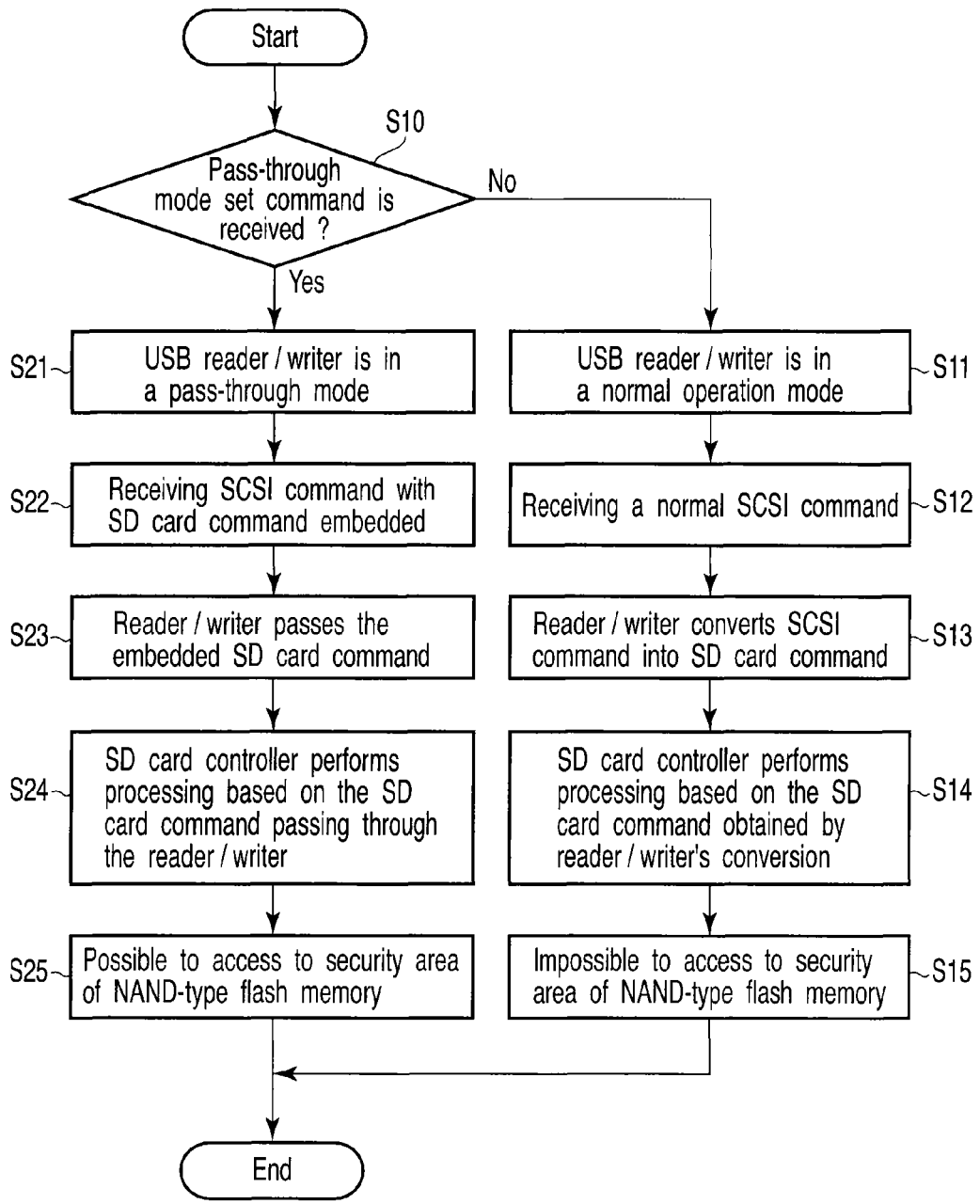
FIG. 24 is a flowchart showing the operation of the USB memory device according to the second embodiment.

As described above, the pass-through mode can be achieved by the first logic interface of this embodiment. Hereinafter, a difference between the normal operation mode and pass-through mode will be described simply with reference to FIG. 24. FIG. 24 is a flow chart showing a flow of the operation of the USB memory device.

As shown in FIG. 24, unless the USB reader/writer of the USB memory device receives a pass-through mode set command (step S10, NO), the USB reader/writer still remains in the normal operation mode (step S11). This operation mode is the same as a conventional USB device. That is, the USB reader/writer receives a normal (conventional) SCSI command from the host device (step S12). The USB reader/writer converts the received SCSI command to the SD™ card command and outputs to the SD™ card controller (step S13). Then, the SD™ card controller executes the processing based on the received SD™ card command (step S14). Because the conventional SCSI command does not support the copyright protection function, it can use only commands which agree with the communication protocol of the USB, so that it cannot access the security area of the NAND type flash memory (step S15).

Figure 25:
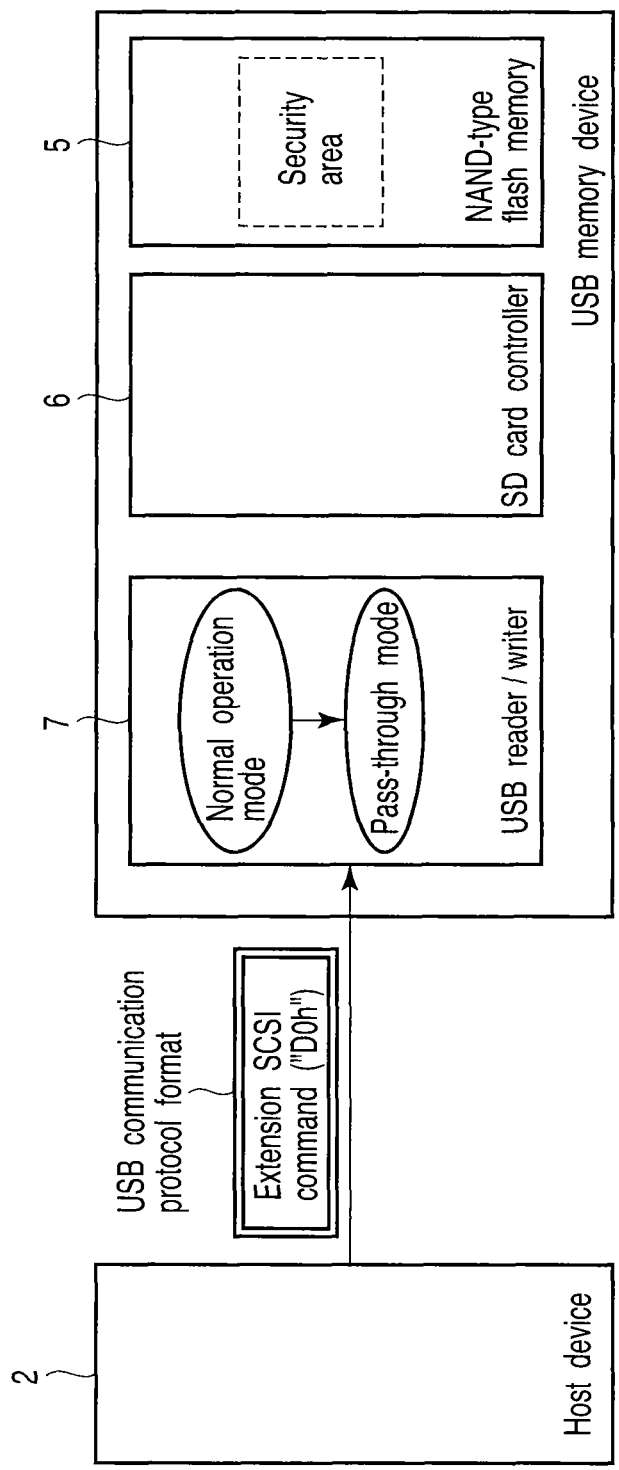

When the pass-through mode set command is received in step S10 (step S10, YES), the USB reader/writer makes the transition to the pass-through mode (step S21). This state is shown in FIG. 25. FIG. 25 is a block diagram of the USB memory device. As shown in figure, the extension SCSI command (pass-through mode set command: "D0h") is sent from the host device 2 to the USB reader/writer in USB communication protocol format. Consequently, the USB reader/writer turns to the pass-through mode. After that, the USB reader/writer becomes capable of receiving other extension SCSI commands "D1h" to "D6h".

Next, the USB reader/writer receives the SCSI command (extension SCSI command) in which the SD™ card command is embedded (step S22). Then, the USB reader/writer (MPU of the USB reader/writer) allows the SD™ card command of the extension SCSI commands embedded therein to pass through and to be output to the SD™ card controller (step S24). Then, the SD™ card controller executes the processing based on the SD™ card command which passes through the USB reader/writer (step S24).

The state in Step S22 to S24 is shown in FIG. 26. FIG. 26 is a block diagram of the USB memory device, which shows the state in which the host device 2 reads the MKB and the media ID from the SD™ card controller 6.

As illustrated in FIG. 26, the extension SCSI command (Execute command: "D2h") is transferred from the host device 2 to the USB reader/writer according to the format of the USB communication protocol. A reading instruction of the MKB and media ID is embedded in the SCSI command in the format of the SD™ card command (refer to FIG. 18). The USB reader/writer, which is in the pass-through mode, passes the SD™ card command within the SCSI command and supplies it to the SD card controller 6.

Figure 27:
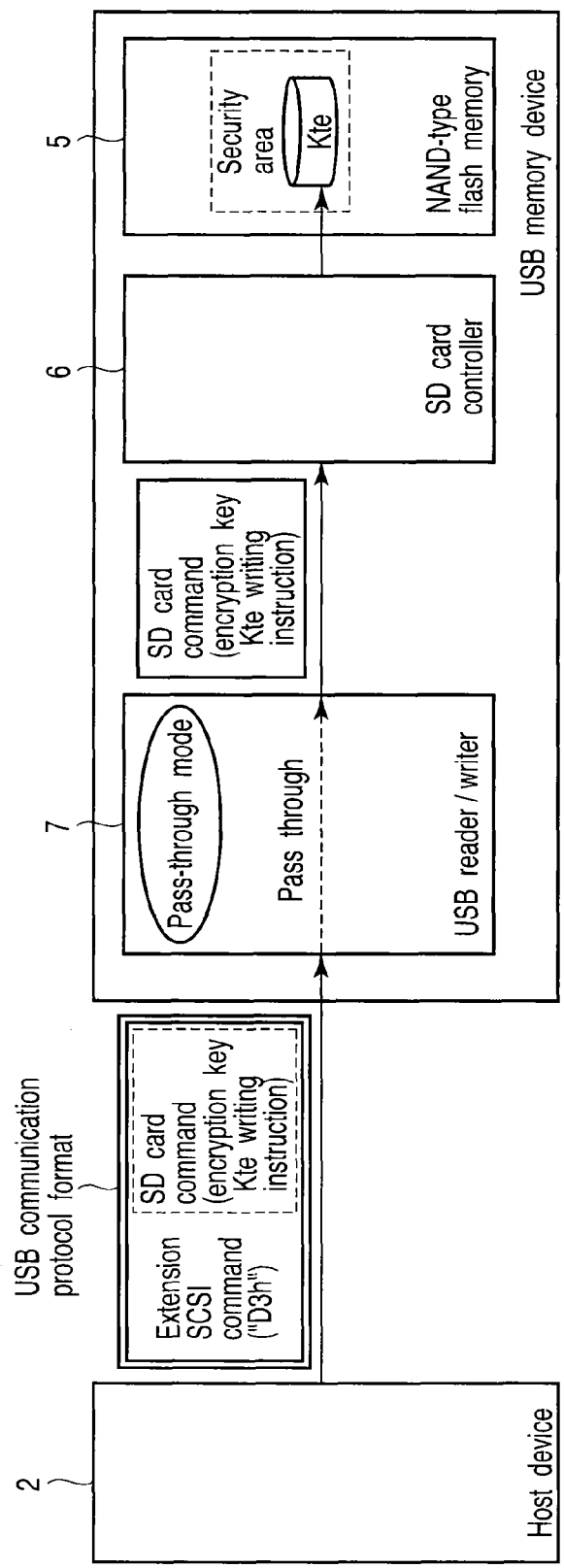

The USB reader/writer makes transition to the pass-through mode, thereby enabling access to the security area of the NAND-type flash memory (Step S25). This state is shown in FIG. 27. FIG. 27 is a block diagram of the USB memory device, showing the state in which the host device 2 writes the encryption key Kte in the security area of the NAND-type flash memory 5. As illustrated in FIG. 27, the extension SCSI command (Execute command: "D3h") is transferred from the host device 2 to the USB reader/writer according to the format of the USB communication protocol. The encryption key Kte and its writing instruction are embedded in this SCSI command in the format of the SD™ card command (refer to FIG. 18). The USB reader/writer, which is in the pass-through mode, passes the SD™ card command within the SCSI command and outputs it to the SD card controller 6. As the result, the SD™ card controller receives the writing instruction of the encryption key Kte and writes the encryption key Kte in the security area of the NAND-type flash memory 5 according to the instruction. Needless to say, the AKE processing is performed in the circuit 10 for CPRM, as mentioned in the first embodiment. Of course, even in the pass-through mode, access to the normal area of the NAND-type flash memory is possible, and in this case, the processing in the CPRM circuit is not necessary similar to the conventional technology.

(Second Logical Interface Example)

In the first logical interface example shown in FIG. 11, the USB reader/writer converts the SCSI command on the USB into the SD™ card command and converts the SD™ card command into the SCSI command, in reading and writing data not requiring the copyright protection (normal read and write). Access to the non-volatile semiconductor memory in the USB memory device is executed according to the SD™ card command.

A second logical interface example is an example in which the USB reader/writer performs conversion between the SCSI command and the SD™ card command, in reading and writing data not requiring the copyright protection (normal read and write).

Figure 28:
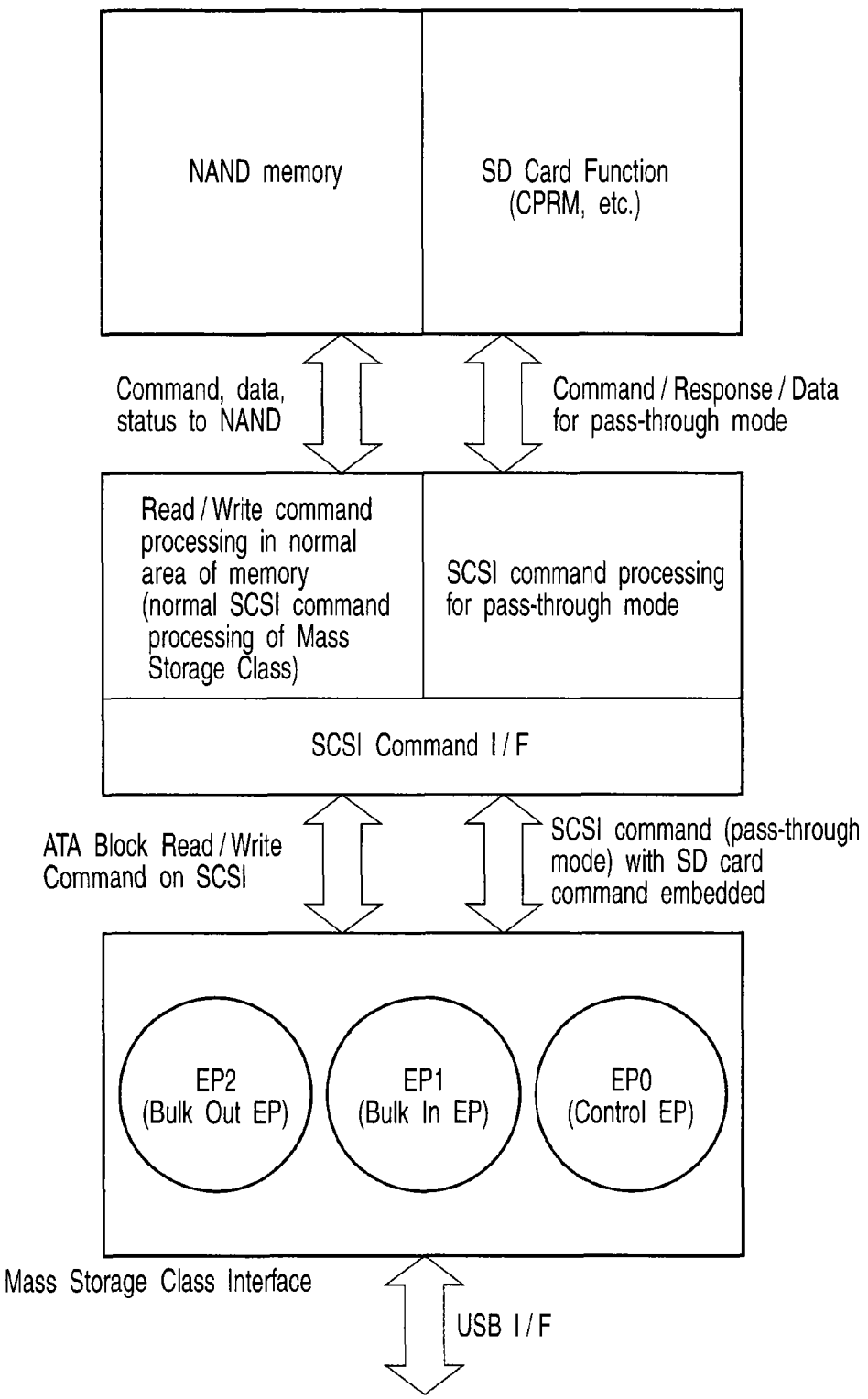
FIG. 28 to FIG. 30 are concept views respectively showing the second to fourth logical interface examples of the USB memories according to the second embodiment.

FIG. 28 is a view showing the second logical interface example of the USB memory device with a copyright protection function according to the second embodiment of the invention.

As illustrated in FIG. 28, in the second logical interface example, in the normal read and write, access to the non-volatile semiconductor memory of the USB memory device is performed according to the SCSI command. In this example, the non-volatile semiconductor memory is the NAND-type flash memory, and the USB reader/writer directly accesses to the NAND-type flash memory without converting into the SD™ card command.

On the other hand, in the reading and writing data (content) requiring the copyright protection, the SD™ card command is embedded in the SCSI command similarly to the first logical interface example and access to the non-volatile semiconductor memory is performed according to the embedded SD™ card command.

The second logical interface example is the same as the first logical interface example as for the logical interface on the USB between the host and the USB reader/writer, except that the USB reader/writer does not perform the conversion between the SCSI command and the SD™ card command in the normal read and write.

(Third Logical Interface Example)

Figure 29:
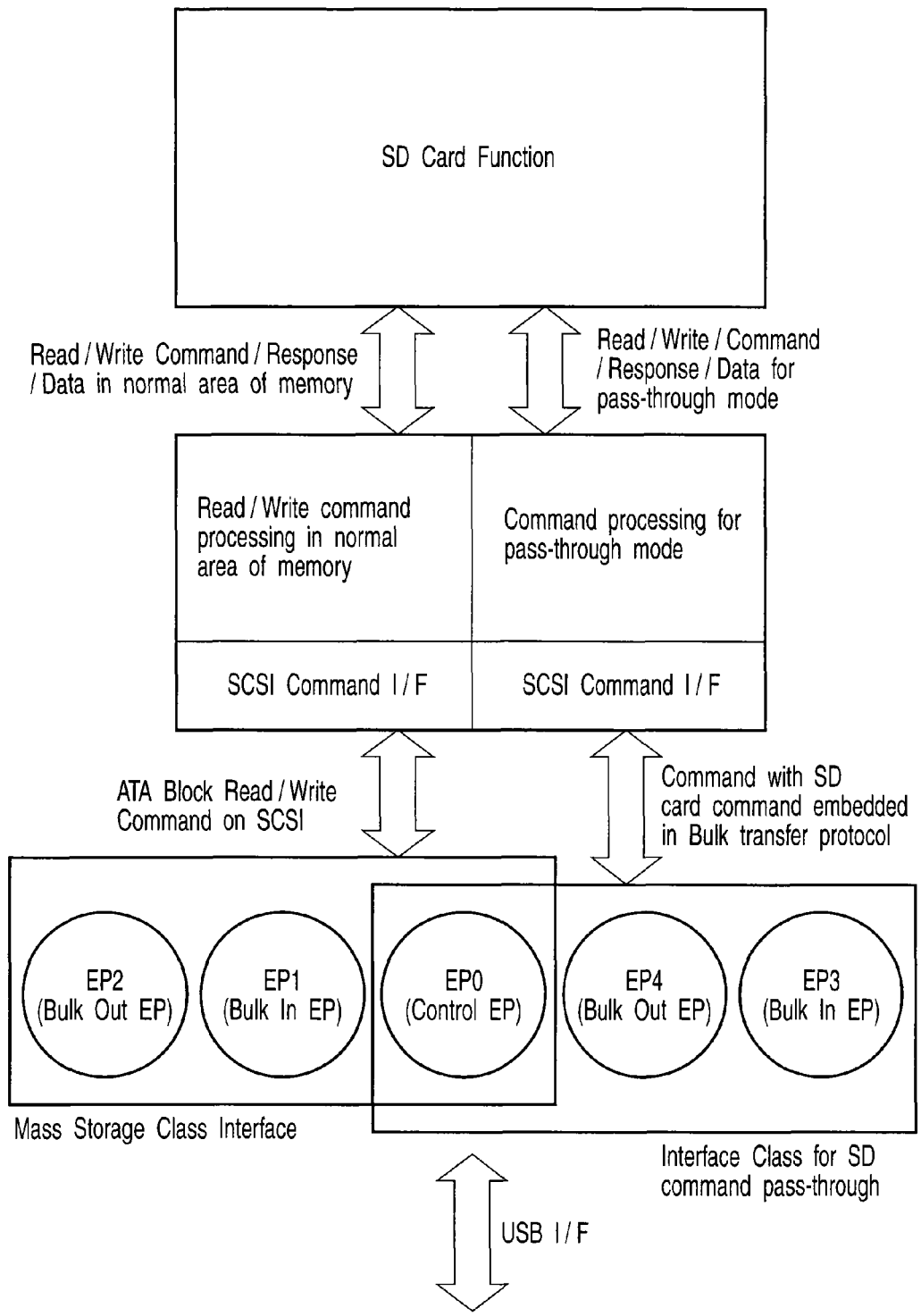

FIG. 29 is a view showing a third logical interface example of the USB memory device with a copyright protection function according to the second embodiment of the invention.

As illustrated in FIG. 29, the third logical interface example includes a USB interface used for the pass-through mode and a USB interface used for the mode other than the pass-through mode.

In the pass-through mode, the data (content) requiring the copyright protection is transferred between the host and the USB memory device, and in the mode other than the pass-through mode, the data (content) not requiring the copyright protection is transferred between the host and the USB memory device.

In the example, the command format on the USB interface in the pass-through mode and the communication protocol are the same as those of the first logical interface example. The transferred data is set at the added end points EP3 and EP4 in this example.

The USB interface used in the mode other than the pass-through mode may be, for example, the standard USB interface, for example, mass storage class interface. In this example, the transfer data is set at the end points EP1 and EP2. Further, in this example, the USB reader/writer performs the conversion between the SCSI command and the SD™ card command in the normal read/write in the mode other than the pass-through mode, similarly to the first logical interface example.

(Fourth Logical Interface Example)

Figure 30:
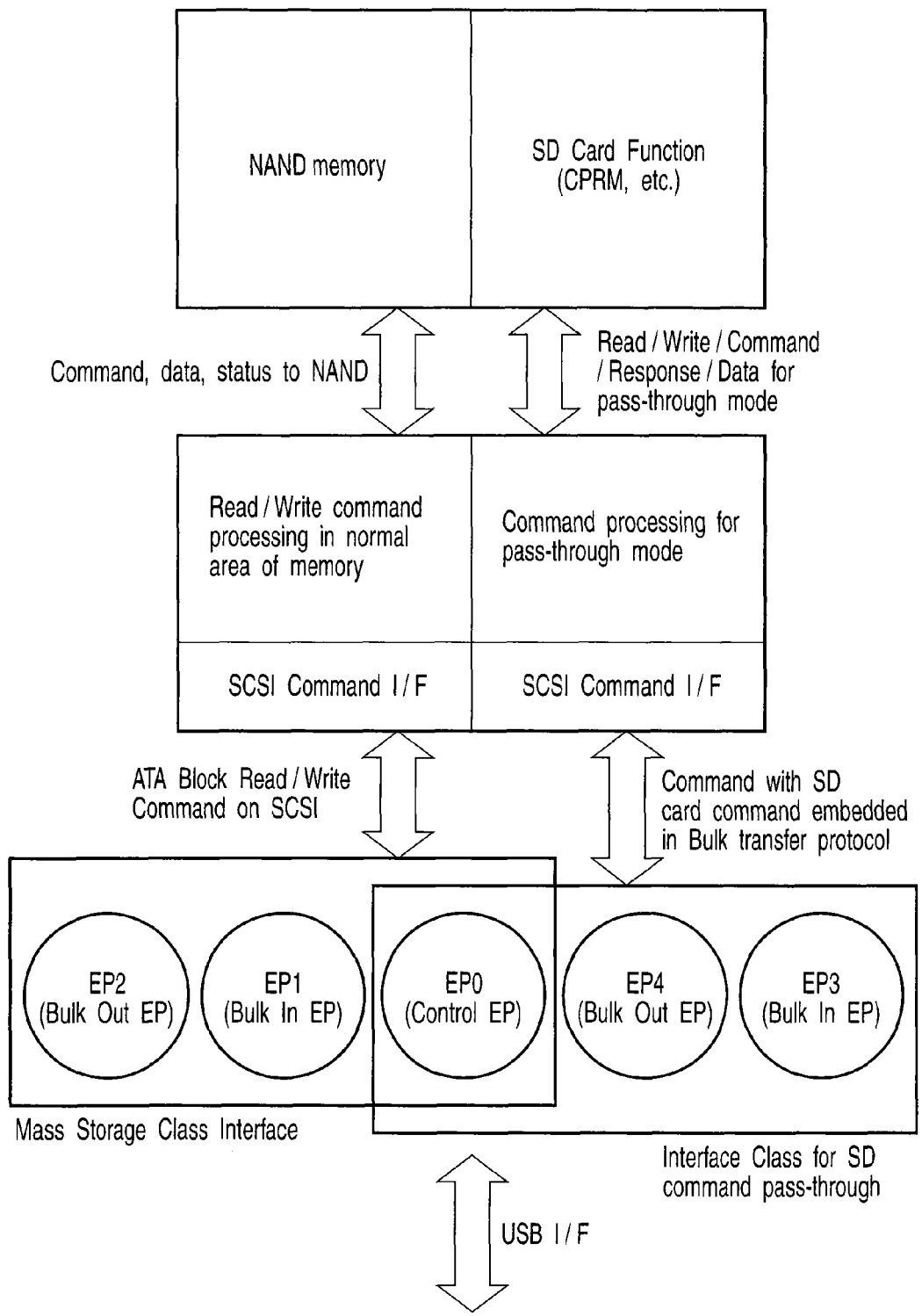

FIG. 30 is a view showing a fourth logical interface example of the USB memory device with a copyright protection function according to the second embodiment of the invention.

As illustrated in FIG. 30, the fourth logical interface example includes a USB interface used for the pass-through mode and a USB interface used for the mode other than the pass-through mode, similarly to the third logical interface example.

The fourth logical interface example is different from the third logical interface example; the USB reader/writer accesses the non-volatile semiconductor memory according to the SCSI command without command conversion, similarly to the second logical interface example, although in the third logical interface example, it converts a command between the SCSI command and the SD™ card command in the mode other than the pass-through mode.

The third and fourth logical interface examples have a complicated interface structure, compared with the case of using the SCSI command on one mass storage class interface like the first and second logical interface examples, but they have an advantage of decreasing a restriction on the driver structure of a host because the pass-through mode is independent in these interfaces.

In the first to fourth logical interface examples, although the pass-through mode is realized by using the SCSI command similarly to the mass storage class as the interface class for the pass-through mode, the command format can be converted into a command format that is not the SCSI command format.

In the first and fourth logical interface examples, although the class interface example having a bulk end point has been described as the mass storage class interface for the pass-through mode, the logical interface for the pass-through mode may be formed by a class interface formed by only a control end point (a default end point which can be shared with the interface of each device class (HID (Human Interface Device: key board or mouse) and audio). In this case, the transfer in the pass-through mode is performed at low speed, however, the additional end point is not required and it is advantageous in the cost performance.

In the above embodiments, the case of forming the USB memory device by the non-volatile semiconductor memory 5, the memory controller 6, and the USB reader/writer 7 which are provided in the same case, has been described. However, the non-volatile semiconductor memory 5 and the memory controller 6 may be provided in a case other than that of the USB reader/writer 7. Namely, for example, in the structure described in FIG. 7, the SD™ card function MCP 5-3 and the USB reader/writer chip 7-1 may be separated. This will be described using FIG. 31. FIG. 31 is a block diagram of the memory system according to the modification of the above embodiments.

As illustrated in FIG. 31, the memory system includes the USB reader/writer 7 and the SD™ card 30. The SD™ card 30 has the same structure as that of the SD™ card function MCP 5-3 in FIG. 7 and this MCP 5-3 forms the memory card (SD™ card) by itself. The USB reader/writer 7, having the structure including the USB reader/writer chip 7-1 and the USB connector 4 in FIG. 7, further includes the SD card connector. The SD™ card I/F 12 of the SD™ card 30 is connected to the SD™ card I/F/connector 29. Namely, the USB connector 4, the USB reader/writer function, and the SD card I/F/connector 29 are formed on the same semiconductor substrate.

The above embodiments can be also applied to the structure shown in FIG. 31. Namely, the structure in which the USB reader/writer 7 is connected to the SD™ card 30 can be regarded as the same structure of the USB memory device described in the above embodiments, and also in this case, the logical interface viewed from the USB I/F 22 can be regarded as being similar to the above embodiments.

Although the above embodiments have been described by way of example of the NAND-type flash memory used as the non-volatile semiconductor memory, the non-volatile semiconductor memory is not restricted to the NAND-type flash memory. For example, it may be replaced with the AND flash memory.

Although in the above embodiments, the non-volatile semiconductor memory adopts the CPRM function included in the SD™ card function as the copyright protection function, the copyright protection function is not restricted to the CPRM function included in the SD™ card function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A device comprising:
a controller which includes a first processor receiving commands from a host and a second processor processing commands transmitted from the first processor, the controller distinguishing at least two commands; and
a memory which includes a security area capable of holding data and a third processor processing a command processed by the first processor,
wherein when a command transmitted from the host is an extension command including copyright protection information, the first processor does not execute a translation process of the copyright protection information,
when a command transmitted from the host is not the extension command, the first processor executes the translation process of the copyright protection information and transmits, to the memory, a command to which the translation process is executed,
the third processor receives a command transmitted from the first processor, and performs an authentication process with the host,
the copyright protection information initiates a copyright protection function,
the extension command includes an operation code, a reserved area, argument information, and length information, and
the memory is outside of the controller.

2. The device according to claim 1, wherein the memory is a component in which a third controller as the third processor and a NAND flash memory are embedded.

3. The device according to claim 1, wherein a fourth processor which executes the copyright protection function outputs a response after receiving a command.

4. The device according to claim 1, wherein access to the security area is allowed after the third processor receives a command from the host.

5. The device according to claim 1, wherein a NAND flash memory is embedded in the device, and
the device is a memory device removable from the host.

* * * * *